US012598383B2

(12) United States Patent
Choi et al.

(10) Patent No.:  US 12,598,383 B2
(45) Date of Patent:          Apr. 7, 2026

(54) ELECTRONIC DEVICE AND METHOD FOR USING CAMERA ACCORDING TO WEARING OF LENS-TYPE ACCESSORY

(71) Applicant: Samsung Electronics Co., Ltd., Suwon-si (KR)

(72) Inventors: Gwangho Choi, Suwon-si (KR); Jongah Kim, Suwon-si (KR); Heewoong Yoon, Suwon-si (KR); Kihyuk Lee, Suwon-si (KR); Donghan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 41 days.

(21) Appl. No.: 18/825,563

(22) Filed: Sep. 5, 2024

(65) Prior Publication Data

US 2025/0047979 A1      Feb. 6, 2025

Related U.S. Application Data

(63) Continuation    of    application    No. PCT/KR2023/002489, filed on Feb. 21, 2023.

(30) Foreign Application Priority Data

Apr. 26, 2022    (KR) ........................ 10-2022-0051718
May 17, 2022    (KR) ........................ 10-2022-0060495

(51) Int. Cl.
H04N 23/67        (2023.01)
H04N 23/667       (2023.01)
(52) U.S. Cl.
CPC ......... H04N 23/671 (2023.01); H04N 23/667 (2023.01)

(58) Field of Classification Search
None
See application file for complete search history.

(56) References Cited

U.S. PATENT DOCUMENTS 8,515,271  B2    8/2013  Tanaka
10,165,173  B2    12/2018  Kim
(Continued)

FOREIGN PATENT DOCUMENTS

CN        114422701 A  *  4/2022  ............. H04N 23/45
KR        10-1604421 B1    3/2016
(Continued)

OTHER PUBLICATIONS

English translation of CN-114422701-A, An, 2022 (Year: 2022).*
(Continued)

*Primary Examiner* — James M Hannett
(74) *Attorney, Agent, or Firm* — Jefferson IP Law, LLP

(57)        ABSTRACT

A method performed by an electronic device is provided. The method includes receiving, through a distance detection sensor, second signals in which a first signal transmitted through the distance detection sensor is reflected by an external object, identifying a distance from the external object based on at least a part of the second signals, obtaining a deviation information value for the second signals based on identifying that the distance is less than a reference distance, obtaining an image including a visual object corresponding to the external object through a first camera based on the deviation information value being greater than or equal to a reference value, and obtaining the image including the visual object corresponding to the external object through a second camera according to a camera switching, based on the deviation information value being less than the reference value.

20 Claims, 13 Drawing Sheets

(56) References Cited

U.S. PATENT DOCUMENTS

| | | | |
|---|---|---|---|
| 10,203,474 | B2 | 2/2019 | O'Neill |
| 10,594,920 | B2 | 3/2020 | Yang et al. |
| 10,951,833 | B2 | 3/2021 | Yuan |
| 11,523,043 | B2 | 12/2022 | Gamadia et al. |
| 2018/0013955 | A1 | 1/2018 | Kim et al. |
| 2022/0070435 | A1 | 3/2022 | Lee et al. |

FOREIGN PATENT DOCUMENTS

| | | | | |
|---|---|---|---|---|
| KR | 10-2019-0124055 | A | 11/2019 | |
| KR | 10-2020-0095758 | A | 8/2020 | |
| KR | 10-2020-0095918 | A | 8/2020 | |
| KR | 10-2240817 | B1 | 4/2021 | |
| KR | 20220015752 | A * | 2/2022 | ............ H04N 23/60 |
| WO | 2013/047220 | A1 | 4/2013 | |
| WO | WO-2019172577 | A1 * | 9/2019 | ............ G06T 7/521 |
| WO | 2021/066219 | A1 | 4/2021 | |

OTHER PUBLICATIONS

English translation of KR-20220015752-A, Lee, 2022 (Year: 2022).*
English translation of WO-2019172577-A1, Keh, 2019 (Year: 2019).*
International Search Report and Written Opinion dated May 24, 2023, issued in International Application No. PCT/KR2023/002489.

* cited by examiner

ELECTRONIC DEVICE AND METHOD FOR USING CAMERA ACCORDING TO WEARING OF LENS-TYPE ACCESSORY

CROSS-REFERENCE TO RELATED APPLICATION(S)

This application is a continuation application, claiming priority under § 365(c), of an International application No. PCT/KR2023/002489, filed on Feb. 21, 2023, which is based on and claims the benefit of a Korean patent application number 10-2022-0051718, filed on Apr. 26, 2022, in the Korean Intellectual Property Office, and of a Korean patent application number 10-2022-0060495, filed on May 17, 2022, in the Korean Intellectual Property Office, the disclosure of each of which is incorporated by reference herein in its entirety.

BACKGROUND

1. Field

The disclosure relates to an electronic device and a method for identifying wearing of a lens-type (lenticular) accessory through a distance detection sensor, a type of a depth sensor, to prevent switching to a short-range camera.

2. Description of Related Art

With the introduction of depth sensors, an electronic device may identify a distance from an external object or identify a space. The electronic device may determine whether to utilize either a long-range camera or a short-range camera, based on the identified distance from the external object. The depth sensors may include a time of flight (TOF) sensor, a structured light (SL) sensor, a ranging sensor, a light detection and ranging (Lidar), a radio detection and ranging (Radar), or the like. Driving schemes of the time of flight (TOF) sensors may be divided into a direct method and an indirect method.

Along with the recent development of camera technologies incorporated into electronic devices, demand for removable lenticular (lens-type) accessories has increased to improve camera performance. Such a lens-type accessory may be attached to a front side of a camera of the electronic device. For example, light may pass through a portion of the lens-type accessory to be introduced into the camera of the electronic device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device configured to use a long-range camera even if a distance detection sensor, which is a type of a depth sensor, identifies a short distance from an external object, when the electronic device is worn with a lenticular (lens-type) accessory.

Additional aspects will be set forth in part in the description which follows and, in part, will be apparent from the description, or may be learned by practice of the presented embodiments.

In accordance with an aspect of the disclosure, an electronic device is provided. The electronic device includes memory storing one or more computer programs, a distance detection sensor, a plurality of cameras including a first camera and a second camera, and one or more processors communicatively coupled to the memory, the distance detection sensor, and plurality of cameras, wherein the one or more computer programs include computer-executable instructions that, when executed by the one or more processors individually or collectively, cause the electronic device to receive, through the distance detection sensor, second signals in which a first signal transmitted through the distance detection sensor is reflected by an external object, identify a distance from the external object based on at least a part of the second signals, obtain a deviation information value for the second signals based on identifying that the distance is less than a reference distance, obtain an image including a visual object corresponding to the external object through a first camera, based on the deviation information value being greater than or equal to a reference value, and obtain the image including the visual object corresponding to the external object through a second camera according to a camera switching, based on the deviation information value being less than the reference value.

In accordance with another aspect of the disclosure, a method performed by an electronic device is provided. The method includes receiving, through a distance detection sensor, second signals in which a first signal transmitted through the distance detection sensor is reflected by an external object, identifying a distance from the external object based on at least a part of the second signals, obtaining a deviation information value for the second signals based on identifying that the distance is less than a reference distance, obtaining an image including a visual object corresponding to the external object through a first camera, based on the deviation information value being greater than or equal to a reference value, and obtaining the image including the visual object corresponding to the external object through a second camera according to a camera switching, based on the deviation information value being less than the reference value.

In accordance with another aspect of the disclosure, one or more non-transitory computer-readable storage media storing computer-executable instructions that, when executed by one or more processors individually or collectively, cause the electronic device to perform operations are provided. The operations include receiving, through a distance detection sensor, second signals in which a first signal transmitted through the distance detection sensor is reflected by an external object, identifying a distance from the external object based on at least a part of the second signals, obtaining a deviation information value for the second signals based on identifying that the distance is less than a reference distance, obtaining an image including a visual object corresponding to the external object through a first camera based on the deviation information value being greater than or equal to a reference value, and obtaining the image including the visual object corresponding to the external object through a second camera according to a camera switching, based on the deviation information value being less than the reference value.

An electronic device and a method according to embodiments of the disclosure may use a long-range camera based on identifying whether a lens-type accessory is worn, even when a distance from an external object detected by a depth sensor is short. That is to say, when wearing a lens-type accessory, the electronic device may obtain an image including the external object with the long-range camera, since the camera setting is not set to a short-range camera.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
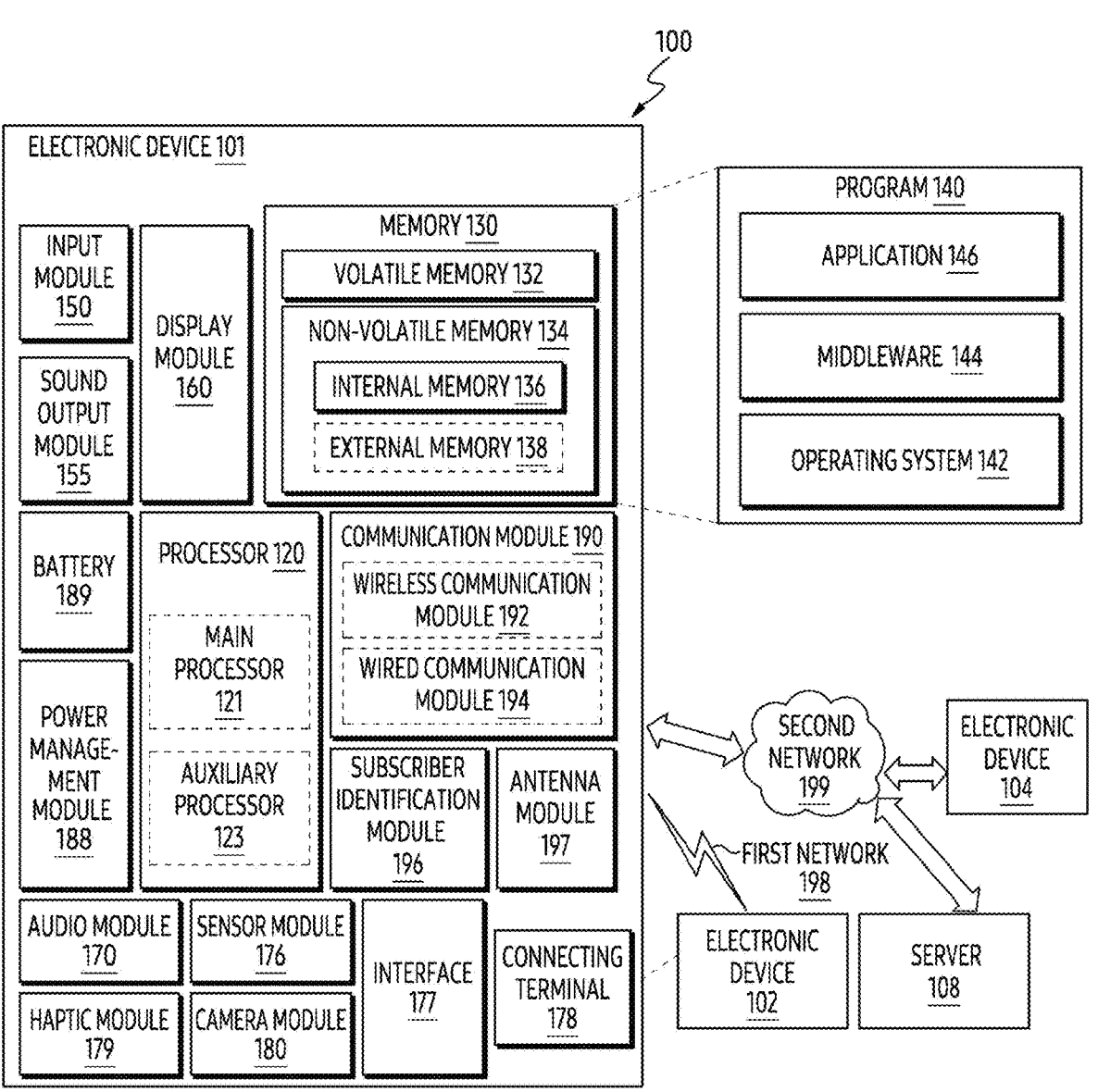
FIG. 1 illustrates a functional configuration of an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include computer-executable instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g., a central processing unit (CPU)), a communication processor (CP, e.g., a modem), a graphical processing unit (GPU), a neural processing unit (NPU) (e.g., an artificial intelligence (AI) chip), a wireless-fidelity (Wi-Fi) chip, a Bluetooth™ chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an IC, or the like.

An electronic device may wear accessories to improve camera performance such as a neutral density (ND) filter, a polarized light filter, or the like. An electronic device and a method according to embodiments of the disclosure propose a method for identifying whether an accessory item is worn in order to obtain an image via a suitable camera. In particular, during a camera switching or auto focus (AF) operation, the electronic device may use a long-range camera in spite of a short distance from an external object. In other words, the electronic device may select an appropriate camera based on a focal length, thereby preventing degradation in its camera image quality.

FIG. 1 is a diagram illustrating a functional configuration of an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added to the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter-wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, an RFIC disposed on a first surface (e.g., a bottom surface) of the printed circuit board, or adjacent to the first surface and capable of supporting a designated high-frequency band (e.g., the mmWave band), and a plurality of antennas (e.g., array antennas) disposed on a second surface (e.g., a top surface or a side portion) of the printed circuit board, or adjacent to the second surface and capable of transmitting or receiving signals of the designated high-frequency band.

At least some of the above-described components may be coupled to each other and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102 or 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2A:
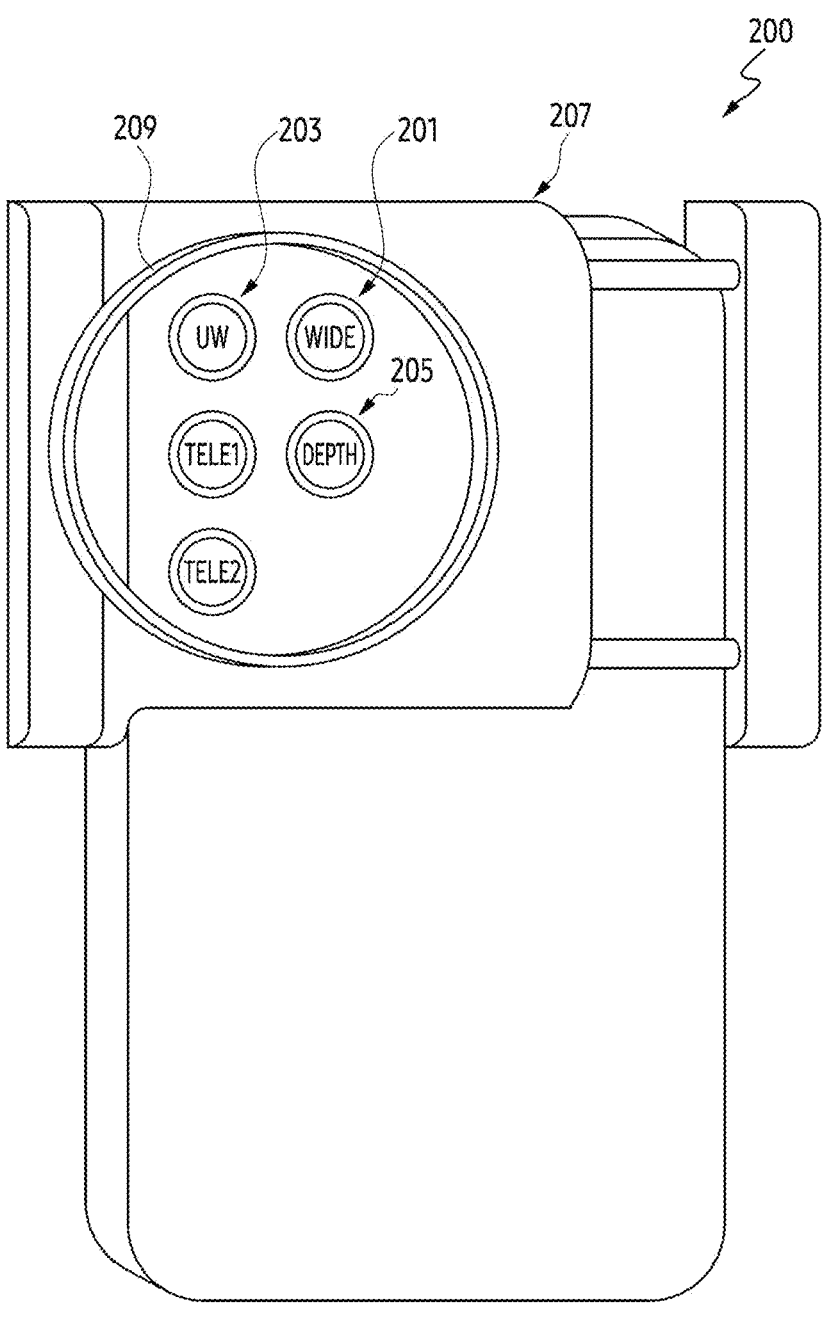
FIG. 2A illustrates a diagram in which an electronic device wears a lens-type accessory, according to an embodiment of the disclosure.

FIG. 2A illustrates a diagram 200 in which an electronic device wears a lens-type (lenticular) accessory, according to an embodiment of the disclosure. The electronic device illustrates an example electronic device 101 of FIG. 1.

Referring to FIG. 2A, the electronic device 101 may include a plurality of cameras. For example, the electronic device 101 may include a first camera 201, a second camera 203, and a distance detection sensor 205. The electronic device may wear the lens-type accessory 207.

A focal length of the first camera 201 may be greater than a focal length of the second camera 203. The focal length of the second camera 203 may be less than that of the first camera 201. For example, the first camera 201 may be a wide-angle camera. The second camera 203 may be an ultra-wide-angle camera. The ultra-wide-angle camera may be used when a camera switching distance is a first threshold distance (e.g., 28 cm or less) and its zoom scale is in a specified first scaling range (e.g., greater than or equal to 1× magnification and less than 3× magnification). The wide-angle camera may be used when the camera switching distance is a second threshold distance (e.g., 30 cm or more) and its zoom scale is in a specified second scaling range (e.g., greater than or equal to 1× magnification and less than 3× magnification), or when the camera switching distance is a third threshold distance (e.g., less than 40 cm) and its zoom scale is in a specified third scaling range (e.g., greater than or equal to 3× magnification and less than 10× magnification). A first telephoto camera may be used when the camera switching distance is a fourth threshold distance (e.g., 50 cm or more) and the zoom scale is in a specified fourth scaling range (e.g., more than or equal to 3× magnification and less than 10× magnification), or when the camera switching distance is a fifth threshold distance (e.g., 80 cm or less) and the zoom scale is in a specified fifth scaling range (e.g., more than or equal to 10× magnification and less than 15× magnification). A second telephoto camera may be used when the camera switching distance is a sixth threshold distance (e.g., 100 cm or more) and the zoom scale is in a specified sixth scaling range (e.g., more than or equal to 10× magnification and less than 15× magnification).

The distance detection sensor 205 may refer to a depth sensor. The distance detection sensor 205 may include a time of flight (TOF) sensor. The distance detection sensor 205 may include a range sensor.

The electronic device 101 may wear a lens-type accessory 207. The lens-type accessory 207 may include a light transmission region 209 for transmitting light. The lens-type accessory 207 may include a neutral density (ND) filter or a polarized light filter. The ND filter or the polarized light filter may have the form of covering both the cameras (e.g., a first camera and a second camera) and the distance detection sensor. The lens-type accessory 207 may be fixed to the electronic device 101. The lens included in the lens-type accessory 207 may be configured to be replaceable by rotation.

According to embodiments of the disclosure, while the camera operates, the electronic device 101 may be in a first state of obtaining an image including an external object through the first camera 201. The electronic device 101 may be in a second state of obtaining an image including the external object through the second camera 203. The electronic device 101 may obtain a distance from the external object using the distance detection sensor 205. The state of the electronic device 101 may be switched from the first state to the second state based on the obtained distance. For example, while the camera operates, the electronic device 101 may be in the first state of obtaining an image including the external object through the wide-angle camera 201. The electronic device 101 may be in the second state of obtaining an image including the external object through an ultra-wide-angle camera 203. The electronic device 101 may obtain a distance from the external object based on the distance detection sensor. The state of the electronic device 101 may be switched from the first state to the second state based on whether the distance from the external object is less than a reference value. In other words, based on whether the distance from the external object identified by the distance detection sensor 205 is less than the reference value, the camera setting may be switched from the wide-angle camera 201, which is a long-range camera, to the ultra-wide-angle camera 203, which is a short-range camera. According to embodiments of the disclosure, even if the distance from the external object is less than the reference value, the wide-angle camera 201 may be continuously used, based on a deviation information value for the second signals. For example, when a standard deviation of the peak signal intensity for each region of the distance detection sensor among the second signals is greater than or equal to the reference value, the wide-angle camera 201 may be continuously used. For example, the camera setting may be switched from the wide-angle camera 201 to the ultra-wide-angle camera 203, based on whether the standard deviation of peak signal intensity for each region of the distance detection sensor among the second signals is less than the reference value.

According to an embodiment of the disclosure, while the camera operates, the electronic device 101 may be in a first state of obtaining an image including an external object through the second camera 203. The electronic device 101 may be in a second state of obtaining an image including an external object through the first camera 201. The electronic device 101 may obtain a distance to an external object using the distance detection sensor 205. The state of the electronic device 101 may be switched from the first state of obtaining an image including an external object through the second camera 203 to the second state of obtaining an image including an external object through the first camera 201, based on the obtained distance. For example, when the camera operates, the electronic device 101 may be in the first state of obtaining an image including an external object through the ultra-wide-angle camera 203. The electronic device 101 may be in the second state of obtaining an image including an external object through the wide-angle camera. The electronic device 101 may obtain a distance from the external object, based on a time of flight (TOF) sensor or a range sensor. The state of the electronic device 101 may be switched from the first state of obtaining the image including the external object through the ultra-wide-angle camera 203 to the second state of obtaining the image including the external object through the wide camera 201, based on whether the distance from the external object is greater than or equal to a reference value. In other words, the camera setting may be switched from the ultra-wide camera 203 which is a short-range camera to the wide camera 201 which is a long-range camera, based on whether the distance from the external object identified by the distance detection sensor 205 is greater than or equal to the reference value. According to an embodiment of the disclosure, even if the distance from the external object is less than (smaller than) the reference value, the electronic device 101 may switch the camera setting to the wide-angle camera 201, based on a deviation information value of the second signals. For example, the electronic device 101 may switch the camera setting to the wide-angle camera 201, based on whether a standard deviation of peak signal intensity for each region of the distance detection sensor among the second signals is greater than or equal to the reference value. For example, the electronic device 101 may continuously maintain the camera setting for the ultra-wide-angle camera 203, based on whether the standard deviation of the peak signal intensity for each region of the distance detection sensor among the second signals is less than (smaller than) the reference value.

According to embodiments of the disclosure, the electronic device 101 may wear a lens-type (lenticular) accessory 207. The lens-type accessory 207 may include a light transmission region 209. For example, a neutral density (ND) filter may be included in the light transmission region 209. The ND filter determines the amount of light transmitted. The ND filter may increase the exposure time by reducing the amount of light. For example, a polarized light filter may be included in the light transmission region 209. The polarized light filter may transmit only the light vibrating in any one direction. The polarized light filter may serve to reduce unintended reflection of light by glass, water, or the like. A lens may be included in the light transmission region 209. Users may use lenses to improve camera performance.

According to embodiments of the disclosure, the distance detection sensor 205 may be a direct time of flight (DTOF) sensor. The distance detection sensor 205 may transmit a first signal and then receive a second signal in which the first signal has been reflected by an external object, thereby determining a distance from the external object based on a time interval between transmission of the first signal and reception of the second signal. For example, the shorter the time interval between the transmission of the first signal and the reception of the second signal reception, the distance detection sensor 205 may determine the distance from the external object to be the shorter. For example, the first signal and the second signal of the distance detection sensor 205 may be infrared rays. In order to detect the distance, the distance detection sensor 205 may transmit electromagnetic waves of a certain frequency as a first signal, and then output the distance calculated based on the second signal reflected back by the first signal. For example, a transmitter (e.g., a TX unit) for transmitting signals and a receiver (e.g., an RX unit) for receiving the signals using a specific wavelength (e.g., 940 nm (nanometer), 1400 nm, or the like) may be separately provided to the distance detection sensor. According to embodiments of the disclosure, the distance detection sensor 205 may be an indirect time of flight (ITOF) sensor. The distance detection sensor 205 may determine the distance from the external object based on a difference between a phase of the first signal and a phase of the second signal. For example, the distance detection sensor 205 may determine the distance from the external object to be greater as the difference between the phase of the first signal and the phase of the second signal is the less. For example, the first signal and the second signal may be infrared rays. To identify the distance, the distance detection sensor may transmit electromagnetic waves of a specific frequency as the first signal, and then output the distance determined based on the second signal reflected back from the first signal. For example, a transmitter (e.g., a TX unit) for transmitting a signal and a receiver (e.g., an RX unit) for receiving a signal may be separately configured using a specific wavelength (e.g., 940 nm, 1400 nm, or the like).

The distance detection sensor may be a depth sensor. For example, the depth sensor may be a range sensor. For example, the depth sensor may be a structured light (SL) sensor. For example, the depth sensor may be a light detection and ranging (LiDAR) sensor. For example, the depth sensor may be a radar sensor.

Figure 2B:
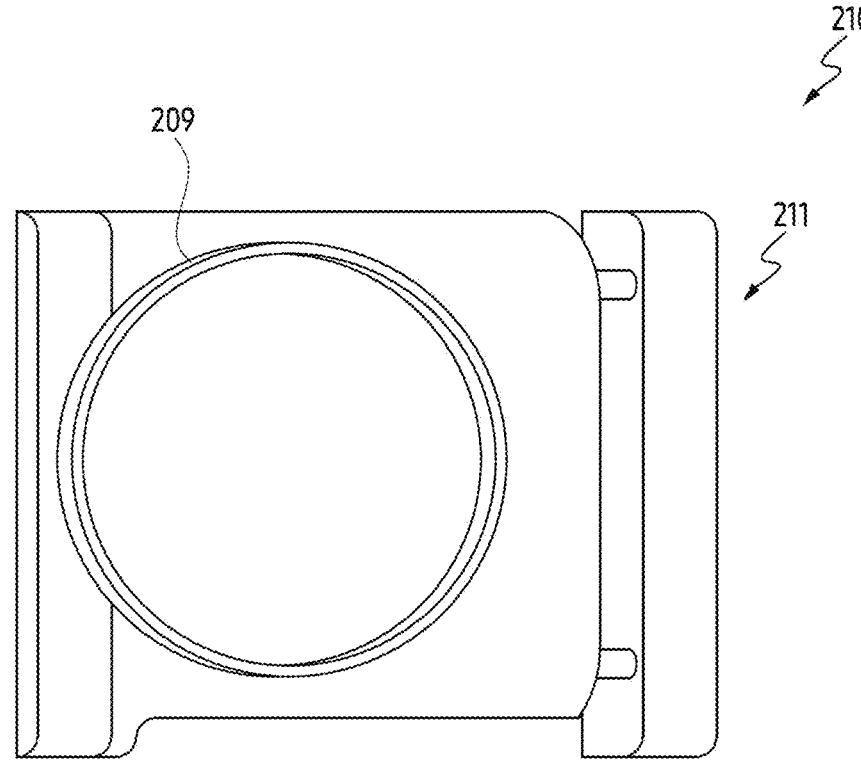
FIG. 2B illustrates a lens-type accessory according to an embodiment of the disclosure.
Figure 2B:
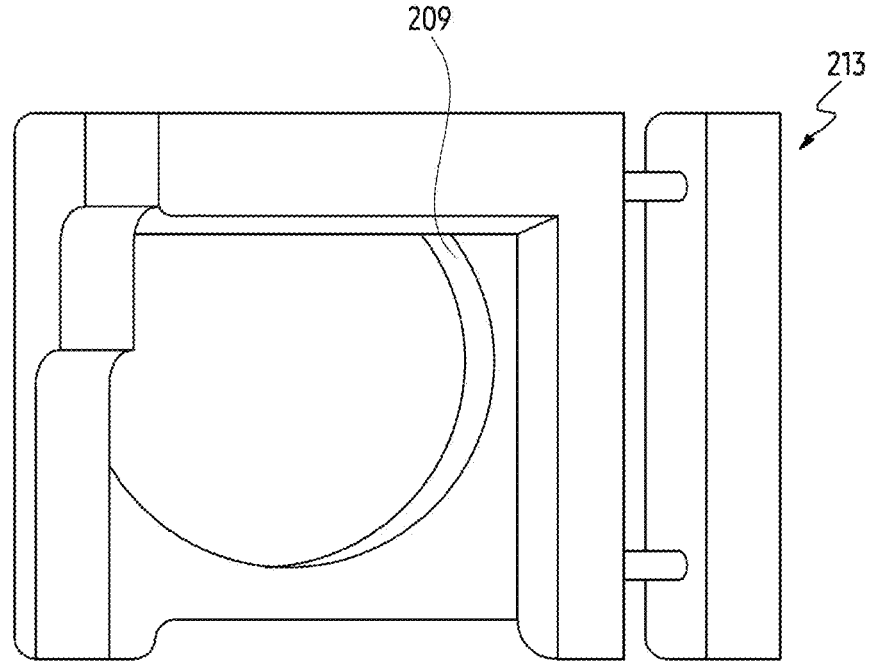

FIG. 2B illustrates a lens-type accessory according to an embodiment of the disclosure.

Referring to FIG. 2B, a first surface 211 shows a front side of the lens-type accessory. A second surface 213 shows a rear side of the lens-type accessory. The lens-type accessory may include a light transmission region 209.

According to embodiments of the disclosure, the electronic device 101 may wear a lens-type accessory by adjusting a width of the lens-type accessory. According to embodiments of the disclosure, a lens-type accessory 210 may include a lens portion, a support portion, and a connection portion. The lens portion may be a portion including a lens transmitting light. The support portion may be configured to attach the lens-type accessory 210 to the electronic device. The connection portion may be a structure for connecting the lens portion and the support portion. The structure for connecting the lens portion and the support portion may be variable. Based on such a variable structure, the lens-type accessory 210 may be fixed to the electronic device 101. The lens-type accessory 210 may be attached to cover the camera of the electronic device 101. For example, light transmitted through at least a portion of the lens-type accessory 210 may be introduced into the camera of the electronic device 101. The electronic device 101 may obtain an image including the external object based on light introduced into the camera.

Figure 3:
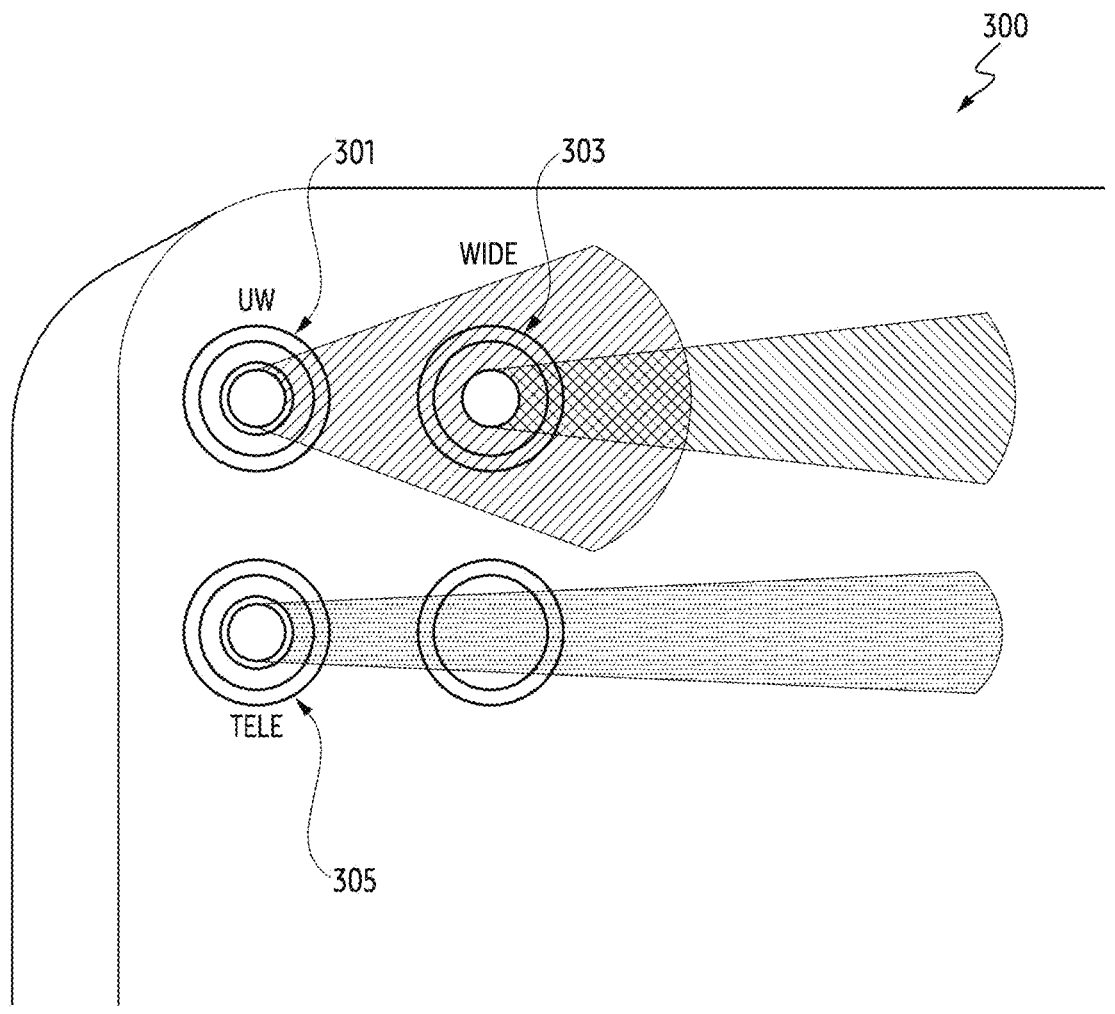
FIG. 3 illustrates cameras having different focal lengths according to an embodiment of the disclosure.

FIG. 3 illustrates cameras 300 having different focal lengths according to an embodiment of the disclosure. The electronic device may exemplify the electronic device 101 of FIG. 1.

Referring to FIG. 3, the electronic device 101 may include a plurality of cameras. For example, the electronic device 101 may include a first camera 301, a second camera 302, and a third camera 305. The focal length of the first camera 301 may be less than those of the second camera 303 and the third camera 305. The focal length of the second camera 303 may be greater than that of the first camera 301 and less than that of the third camera 305. The focal length of the third camera 305 may be greater than that of the first camera 301 and that of the second camera 303.

According to embodiments of the disclosure, the electronic device 101 may include a plurality of cameras. It makes it possible for the electronic device 101 to obtain an image with a camera having an appropriate focal length according to a distance from an external object. The first camera 301 may be an ultra-wide-angle camera. The second camera 303 may be a wide-angle camera. The third camera 305 may be a telephoto camera.

The ultra-wide-angle camera 301 may be used in case where its camera switching distance is a first threshold distance (e.g., 28 cm or less) and its zoom scale is in a specified first scaling range (e.g., more than or equal to 1× magnification and less than 3× magnification). The wide-angle camera 303 may be used in case where the camera switching distance is a second threshold distance (e.g., 30 cm or more) and the zoom scale is in a specified second scaling range (e.g., 1× magnification or more and less than 3× magnification), or the camera switching distance is a third threshold distance (e.g., less than 40 cm) and the zoom scale is in a specified third scaling range (e.g., 3× magnification or more and less than 10× magnification). The first telephoto camera 305 may be used in case where the camera switching distance is a fourth threshold distance (e.g., 50 cm or more) and the zoom scale is in a specified fourth scaling range (e.g., 3× magnification or more and less than 10× magnification), or the camera switching distance is a fifth threshold distance (e.g., 80 cm or less) and the zoom scale is in a specified fifth scaling range (e.g., 10× magnification or more and less than 15× magnification). The second telephoto camera may be used in case where the camera switching distance is a sixth threshold distance (e.g., 100 cm or more) and the zoom scale is in a specified sixth scaling range (e.g., 10× magnification or more and less than 15× magnification).

The electronic device 101 may determine which of the plurality of cameras is to be used to obtain an image, based on a preset zoom scale and a distance from an external object measured by the distance detection sensor. The distance detection sensor may be a depth sensor. For example, the depth sensor may be a range sensor. For example, the depth sensor may be a structured light (SL) sensor. For example, the depth sensor may be a light detection and ranging (LiDAR) sensor. For example, the depth sensor may be a radar sensor.

Figure 4A:
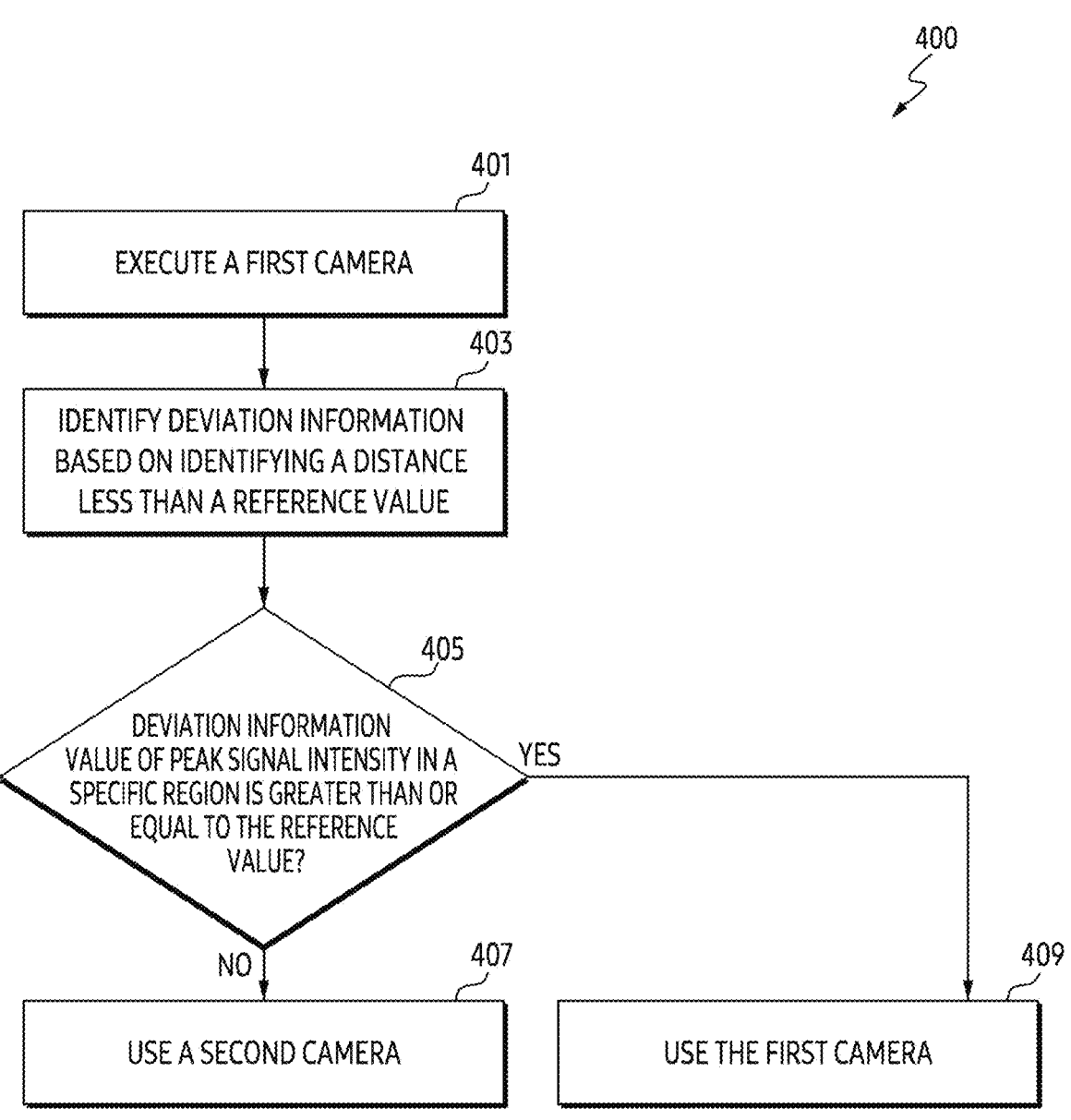
FIG. 4A illustrates an operation flow of an electronic device for using a camera according to wearing of a lens-type accessory based on measurement of a distance detection sensor, according to an embodiment of the disclosure.

FIG. 4A is a flowchart 400 illustrating an operation of an electronic device for using a camera according to wearing of a lens-type accessory based on measurement of a distance detection sensor, according to an embodiment of the disclosure.

Referring to FIG. 4A, in operation 401, the electronic device 101 may execute a first camera. When the camera operates, the electronic device 101 may obtain an image including an external object through the first camera. For example, the first camera may be a wide-angle camera. For example, the focal length of the first camera may be greater than the focal length of the second camera.

In operation 403, the electronic device 101 may identify deviation information based on the distance detection sensor identifying the distance less than a reference value. When the distance detection sensor identifies a distance less than the reference value, the electronic device may identify deviation information of peak signal intensity measured by the distance detection sensor. According to an embodiment of the disclosure, the deviation information may include a standard deviation. According to an embodiment of the disclosure, the deviation information may include a variance.

In operation 405, the electronic device 101 may identify whether a deviation information value of peak signal intensity in a specific region is greater than or equal to a reference value. When the deviation information value of the peak signal intensity in the specific region is less than the reference value, the electronic device 101 may perform operation 407. When the deviation information value of the peak signal intensity in the specific region is greater than or equal to the reference value, the electronic device 101 may perform operation 409. This is because, when the deviation information value of the peak signal intensity in a specific region is greater than or equal to the reference value, it may be considered that a lens-type accessory is worn. Therefore, in order to avoid degradation of the image quality of the image acquired by the camera, the electronic device 101 may use the first camera which is a long-range camera.

According to an embodiment of the disclosure, the deviation information may include the standard deviation. According to an embodiment of the disclosure, the deviation information may include the variance.

In operation 407, the electronic device 101 may use a second camera. The electronic device 101 may obtain an image including an external object using the second camera according to camera switching. The second camera may be an ultra-wide-angle camera. The focal length of the first camera may be greater than that of the second camera.

In operation 409, the electronic device 101 may use the first camera. The electronic device 101 may obtain an image including an external object using the first camera without switching the preset first camera. The first camera may be a wide-angle camera. The focal length of the first camera may be greater than that of the second camera.

Figure 4B:
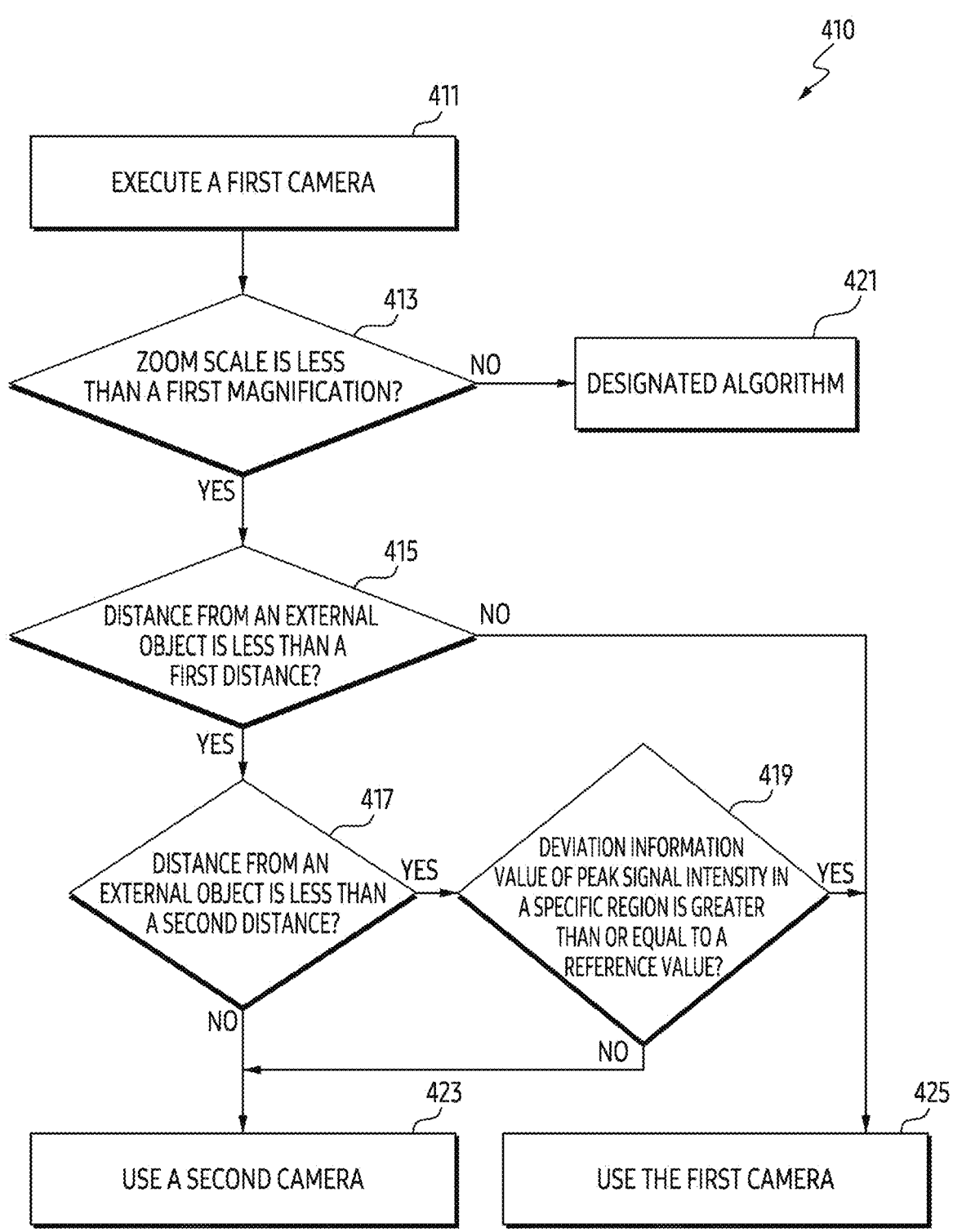
FIG. 4B illustrates an operation flow of an electronic device for using a long-range camera despite a short distance from an external object, based on measurement by a distance detection sensor, according to an embodiment of the disclosure.

FIG. 4B is a flowchart 410 illustrating an operation of an electronic device for using a long-range camera despite a short distance from an external object, based on measurement by a distance detection sensor, according to an embodiment of the disclosure. The distance detection sensor may be a depth sensor. For example, the depth sensor may be a range sensor. For example, the depth sensor may be a structured light (SL) sensor. For example, the depth sensor may be a light detection and ranging (LiDAR) sensor. For example, the depth sensor may be a radar sensor.

Referring to FIG. 4B, in operation 411, when the camera operates, the electronic device 101 may execute the first camera. The electronic device 101 may be in a first state of obtaining an image including an external object through the first camera 201. For example, the first camera may be a wide-angle camera. The focal length of the wide-angle camera may be greater than that of the second camera.

In operation 413, the electronic device 101 may identify whether the zoom scale is less than a first magnification. When the zoom scale is greater than or equal to a reference value, the electronic device 101 may perform operation 421. When the zoom scale is greater than or equal to the first magnification, the electronic device 101 may perform operation 415. According to embodiments of the disclosure, when the zoom scale is less than the first magnification, the electronic device 101 may set the camera to the first camera or the second camera. For example, the first camera may be a wide camera, and the second camera may be an ultra-wide-angle camera. According to embodiments of the disclosure, when the zoom scale is equal to or greater than the first magnification, the electronic device 101 may set the camera to the second camera or the third camera. For example, the second camera may be a wide-angle camera, and the third camera may be a telephoto camera. According to embodiments of the disclosure, the first magnification may be 3× magnification. However, it is not limited to these embodiments.

In operation 421, the camera setting may be determined through a designated algorithm. According to embodiments of the disclosure, the electronic device 101 may identify whether the zoom scale is less than a second magnification. When the zoom scale is less than the second magnification, the electronic device 101 may identify whether the distance from the external object is less than a third distance. When the zoom scale is greater than or equal to the second magnification, the electronic device 101 may identify whether the distance from the external object is less a fourth distance. The distance from the external object may refer to a distance measured by the distance detection sensor. For example, the second magnification may be 10× magnification. For example, the third distance may be 40 cm and the fourth distance may be 80 cm. However, it is not limited to these embodiments. When the zoom scale is less than the second magnification and the distance from the external object is less than the third distance, the electronic device 101 may obtain an image including the external object through the second camera. When the zoom scale is less than the second magnification and the distance from the external object is greater than or equal to the third distance, an image including the external object may be obtained through the third camera. The focal length of the second camera may be less than that of the third camera. For example, the second camera may be a wide-angle camera. For example, the third camera may be a telephoto camera. However, it is not limited to these embodiments. According to embodiments of the disclosure, the electronic device 101 may identify whether the distance from the external object exceeds a fifth distance, before obtaining the image including the external object through the second camera or the third camera. When the distance from the external object is less than or equal to the fifth distance, the electronic device 101 may obtain an image including the external object through the second camera. When the distance from the external object exceeds the fifth distance, the electronic device 101 may obtain an image including the external object through the third camera. For example, the fifth distance may be 50 cm. However, the disclosure is not limited to these embodiments. According to embodiments of the disclosure, when the zoom scale is greater than or equal to the second magnification, the electronic device 101 may obtain an image including the external object through the third camera. The third camera may be a telephoto camera. When there are provided a plurality of telephoto cameras, the electronic device may further identify whether the distance from the external object is less than the fourth distance. The electronic device 101 may determine which telephoto camera to use based on whether the distance from the external object is less than the fourth distance.

In operation 415, the electronic device 101 may identify whether the distance from the external object is less than a first distance. When the distance from the external object is less than the first distance, the electronic device 101 may perform operation 417. When the distance from the external object is greater than or equal to the first distance, the electronic device 101 may perform operation 415. The distance detection sensor included in the electronic device 101 may identify a distance from the external object. For example, the first distance may be 28 cm.

In operation 417, the electronic device 101 may identify whether the distance from the external object is less than a second distance. When the distance from the external object is equal to or greater than the second distance, the electronic device 101 may perform operation 423. When the distance from the external object is less than the second distance, the electronic device 101 may perform operation 419. For example, the second distance may be 1.5 cm. When the electronic device 101 wears a lens-type accessory, the distance detection sensor may identify the lens-type accessory as an external object and then determine a distance from the external object to be short. The distance from the external object may refer to the distance measured by the distance detection sensor.

When the distance from the external object is equal to or greater than the second distance, the electronic device 101 may perform operation 423. This is because the distance from the external object is short enough to operate the second camera, which is a short-range camera, and is too far to identify wearing of a lens-type accessory. When the distance from the external object is less than the second distance, the electronic device 101 may perform operation 419. This is because the distance from the external object is short enough to operate the second camera, which is a short-range lens, and short enough to identify whether a lens-type accessory is worn.

In operation 419, the electronic device 101 may identify whether a deviation information value of peak signal intensity in a specific region is greater than or equal to a reference value. When the deviation information value of the peak signal intensity in the specific region is less than the reference value, the electronic device 101 may perform operation 423. When the deviation information value of the peak signal intensity in the specific region is greater than or equal to the reference value, the electronic device 101 may perform operation 425. This is because, when the deviation information value of the peak signal intensity is greater than or equal to the reference value, it may identify that the lens-type accessory is worn. According to an embodiment of the disclosure, the deviation information may include a standard deviation. According to an embodiment of the disclosure, the deviation information may include a variance. Accordingly, the electronic device 101 may use the first camera, which is a long-range camera, to prevent degradation of picture quality of an image acquired by the camera.

This is because, when the electronic device 101 wears a lens-type accessory, the distance from the external object is measured to be less than or equal to the reference value, and the deviation information value of the peak signal intensity in the specific region of the distance detection sensor is measured to be greater than or equal to the reference value. When the deviation information value of the peak signal intensity is measured to be greater than or equal to the reference value, the electronic device 101 identifies that a lens-type accessory is worn, so the first camera having a focal length greater than that of the second camera is used. This is to obtain a clear image of an external object.

According to embodiments of the disclosure, the deviation information value for the second signals may be determined based on a standard deviation with respect to peak signal intensity for each region of the distance detection sensor among the second signals. When the standard deviation with respect to the peak signal intensity for each region is equal to or greater than the reference value, the electronic device 101 may perform the operation 425.

According to embodiments of the disclosure, the deviation information value for the second signals may be determined based on a variance of the peak signal intensity for each region of the distance detection sensor among the second signals. When the variance of the peak signal intensity for each region is greater than or equal to a reference value, the electronic device 101 may perform the operation 425.

In operation 423, the electronic device 101 may use the second camera according to a camera switching. A focal length of the second camera may be less than that of the first camera. The second camera may be an ultra-wide-angle camera. Since the electronic device 101 identifies that the distance from the external object is short and a lens-type accessory is not worn, the camera having a short focal length may be used.

In the operation 425, the electronic device 101 may use the first camera. The electronic device 101 may use a preset first camera without switching. A focal length of the first camera may be greater than that of the second camera. The first camera may be a wide-angle camera. Since the electronic device 101 identifies that the distance from the external object is long or a lens-type accessory is worn, the camera having a relatively long focal length may be used.

According to embodiments of the disclosure, the electronic device 101 may identify whether the distance from the external object exceeds a sixth distance, before obtaining the image including the external object through the first camera or the second camera. When the distance from the external object is less than or equal to the sixth distance, the electronic device 101 may obtain an image including the external object through the first camera. When the distance from the external object exceeds the sixth distance, the electronic device 101 may identify whether the deviation information value of the peak signal intensity in the specific region is greater than or equal to a reference value. When the distance from the external object exceeds the sixth distance and the deviation information value of the peak signal intensity in the specific region is less than the reference value, the electronic device 101 may obtain an image including the external object through the second camera. When the distance from the external object is less than the sixth distance and the deviation information value of the peak signal intensity in the specific region is greater than or equal to the reference value, the electronic device 101 may obtain an image including the external object through the first camera. For example, the sixth distance may be substantially 3 cm. However, the disclosure is not limited to these embodiments.

Referring to FIGS. 4A and 4B, it is illustrated that the first camera having a focal length greater than that of a second camera is set as a default setting, but embodiments of the disclosure are not limited thereto. The second camera having a focal length less than that of the first camera may be set as a default setting.

Referring to FIG. 4B, the distance from the external object in the operation 405 and the operation 407 is illustrated as one value, but embodiments of the disclosure are not limited thereto. According to embodiments of the disclosure, a plurality of distances from an external object may be obtained depending upon the type of the distance detection sensor. For example, the distance detection sensor may include 64 sub-sensors. A distance from each external object may be obtained from each sub-sensor. One sub-sensor may receive second signals in which a first signal is reflected by an external object, and obtain a distance from the external object based on the first signal and the second signal. The distance detection sensor may obtain a total of 64 distances from the external object. When all the 64 distances from the external object are less than the second distance, the electronic device 101 may perform the operation 413. However, the disclosure is not limited to these embodiments.

Referring to Table 1 below, for example, in case where the electronic device 101 wears a lens-type accessory including an ND filter, the distances from the external object in 64 regions are as follows. The electronic device 101 may identify that the distances from the external object obtained from 64 sub-sensors are all less than or equal to 1.5 cm. The electronic device 101 may identify whether the external object is located close to the camera or whether the electronic device 101 wears the lens-type accessory, based on the deviation information value of the peak signal intensity for each region.

TABLE 1

| | X | | | | | | | |
|---|---|---|---|---|---|---|---|---|
| Y | 1 | 2 | 3 | 4 | 5 | 6 | 7 | 8 |
| 1 | N | 8 | 13 | 8 | 10 | 10 | 9 | N |
| 2 | 5 | 10 | 8 | 0 | 0 | 8 | 9 | 7 |
| 3 | 8 | 10 | 7 | 8 | 8 | 4 | 9 | 7 |
| 4 | 9 | 8 | 7 | 10 | 9 | 8 | 8 | 8 |
| 5 | 9 | 6 | 7 | 9 | 8 | 8 | 7 | 6 |
| 6 | 5 | 7 | 6 | 8 | 5 | 7 | 7 | 4 |
| 7 | 4 | 7 | 5 | 6 | 7 | 7 | 8 | 4 |
| 8 | N | 5 | 4 | 5 | 6 | 5 | 4 | N | unit: mm (millimeter)

Referring to Table 2 below, for example, when a note approaches the camera, the distances from the external object in 64 regions are as follows. The electronic device 101 may identify that the distances from the external object obtained from the 64 sub-sensors are all substantially less than or equal to 1.5 cm. The electronic device 101 may identify whether the external object is located close to the camera or the electronic device 101 wears the lens-type accessory, based on the deviation information value of the peak signal intensity for each region.

TABLE 2

| | X | | | | | | | |
|---|---|---|---|---|---|---|---|---|
| Y | 1 | 2 | 3 | 4 | 5 | 6 | 7 | 8 |
| 1 | N | 8 | 10 | 7 | 9 | 10 | 9 | N |
| 2 | 5 | 8 | 8 | 7 | 7 | 7 | 12 | 9 |
| 3 | 8 | 9 | 6 | 7 | 7 | 6 | 11 | 8 |
| 4 | 10 | 7 | 7 | 9 | 10 | 7 | 10 | 7 |
| 5 | 7 | 7 | 7 | 10 | 9 | 8 | 9 | 8 |
| 6 | 6 | 8 | 9 | 8 | 8 | 8 | 7 | 6 |
| 7 | 8 | 8 | 9 | 9 | 9 | 9 | 8 | 8 |
| 8 | N | 6 | 9 | 7 | 7 | 6 | 5 | N | unit: mm (millimeter)

Figure 5A:
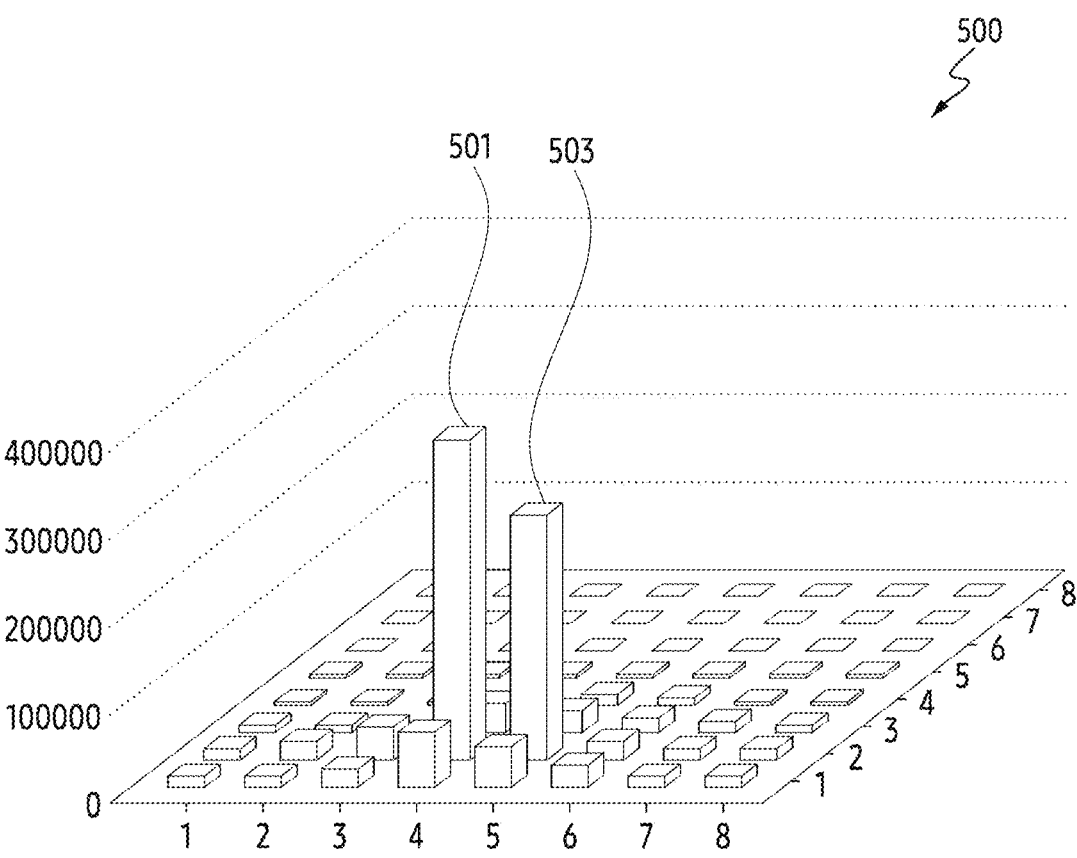
FIG. 5A illustrates a peak signal intensity measured by a distance detection sensor when an electronic device wears a lens-type accessory including a neutral density (ND) filter, according to an embodiment of the disclosure.

FIG. 5A illustrates a peak signal intensity 500 measured by a distance detection sensor when an electronic device is worn with a lens-type accessory with a neutral density (ND) filter according to an embodiment of the disclosure.

According to embodiments of the disclosure, the distance detection sensor may include 64 sub-sensors. One sub-sensor may receive second signals in which a first signal is reflected by an external object. Each sub-sensor may determine an intensity of the largest second signal in each region as the peak signal intensity, regardless of the passage of time. The distance detection sensor may obtain a total of 64 peak signal intensities. The distance detection sensor may be a depth sensor. For example, the depth sensor may be a range sensor. For example, the depth sensor may be a structured light (SL) sensor. For example, the depth sensor may be a light detection and ranging (LiDAR) sensor. For example, the depth sensor may be a radar sensor.

Referring to FIG. 5A, a first peak signal intensity 501 represents the peak signal intensity in a (4,2) region. A second peak signal intensity 503 represents the peak signal intensity in a (5,2) region. In such an (X, Y) system, 'X' represents X coordinates in space, and 'Y' represents Y coordinates in space. In the (X, Y) system, the peak signal intensity is indicated by Z coordinates.

The ND filter may increase the exposure time of the camera by adjusting the amount of transmitted light. The peak signal intensity of each region refers to the peak signal intensity of the second signal reflected from the ND filter. When the electronic device 101 wears the ND filter, the peak signal intensity of the specific region of the distance detection sensor may form a peak. For example, when the electronic device 101 wears a lens-type accessory with the ND filter, the electronic device 101 may identify a deviation information value of peak signal intensity as greater than or equal to a reference value. According to an embodiment of the disclosure, the deviation information value may be a value based on a standard deviation. If it is identified that the value based on the standard deviation of the peak signal intensity is greater than or equal to the reference value, the electronic device 101 may identify that the lens-type accessory is worn. When it is identified that the electronic device 101 wears a lens-type accessory, the electronic device 101 may obtain an image including an external object, using the first camera which is a long-range camera, even if a distance from the external object is less than the first distance. According to another embodiment of the disclosure, the deviation information value may be a value based on variance. When the electronic device 101 identifies that the value based on the variance of the peak signal intensity is greater than or equal to the reference value, the electronic device 101 may identify that the lens-type accessory is worn. When it is identified that the electronic device 101 wears the lens-type accessory, the electronic device 101 may obtain an image including the external object, using the first camera which is a long-range camera, even if the distance from the external object is less than the first distance.

According to embodiments of the disclosure, the first peak signal intensity 501 and the second peak signal intensity 503 peak in the (4,2) region and the (5,2) region, and thus the electronic device 101 may obtain a standard deviation greater than or equal to the reference value. Accordingly, the electronic device 101 may identify that the lens-type accessory is worn. The electronic device 101 may obtain an image including a visual object corresponding to the external object through the first camera.

Referring to Table 3 below, for example, when the electronic device 101 wears the lens-type accessory including the ND filter, the peak signal intensities in 64 regions are as follows. The electronic device 101 may identify whether the external object is positioned close to the camera or whether the electronic device 101 wears the lens-type accessory, based on whether a value based on a standard deviation or variance of peak signal intensities obtained from 64 sub-sensors is greater than or equal to a reference value.

TABLE 3

| | X | | | | | | | |
|---|---|---|---|---|---|---|---|---|
| Y | 1 | 2 | 3 | 4 | 5 | 6 | 7 | 8 |
| 1 | 7263 | 8946 | 15161 | 53185 | 41369 | 15612 | 7809 | 7992 |
| 2 | 6019 | 10209 | 28658 | 393598 | 324269 | 17877 | 9938 | 6159 |
| 3 | 5281 | 9170 | 15609 | 35237 | 24848 | 16318 | 8177 | 5128 |
| 4 | 4330 | 6530 | 9507 | 10395 | 8985 | 10473 | 6523 | 3880 |
| 5 | 3043 | 4324 | 4895 | 5659 | 5266 | 4214 | 4214 | 3104 |
| 6 | 2407 | 2611 | 4057 | 4808 | 4734 | 2505 | 2505 | 2380 |
| 7 | 2131 | 2060 | 2387 | 3020 | 2849 | 1861 | 1861 | 2237 |
| 8 | 2323 | 2004 | 1700 | 1825 | 1898 | 2305 | 2305 | 2972 | unit: kcps (kilo count per second)

Figure 5B:
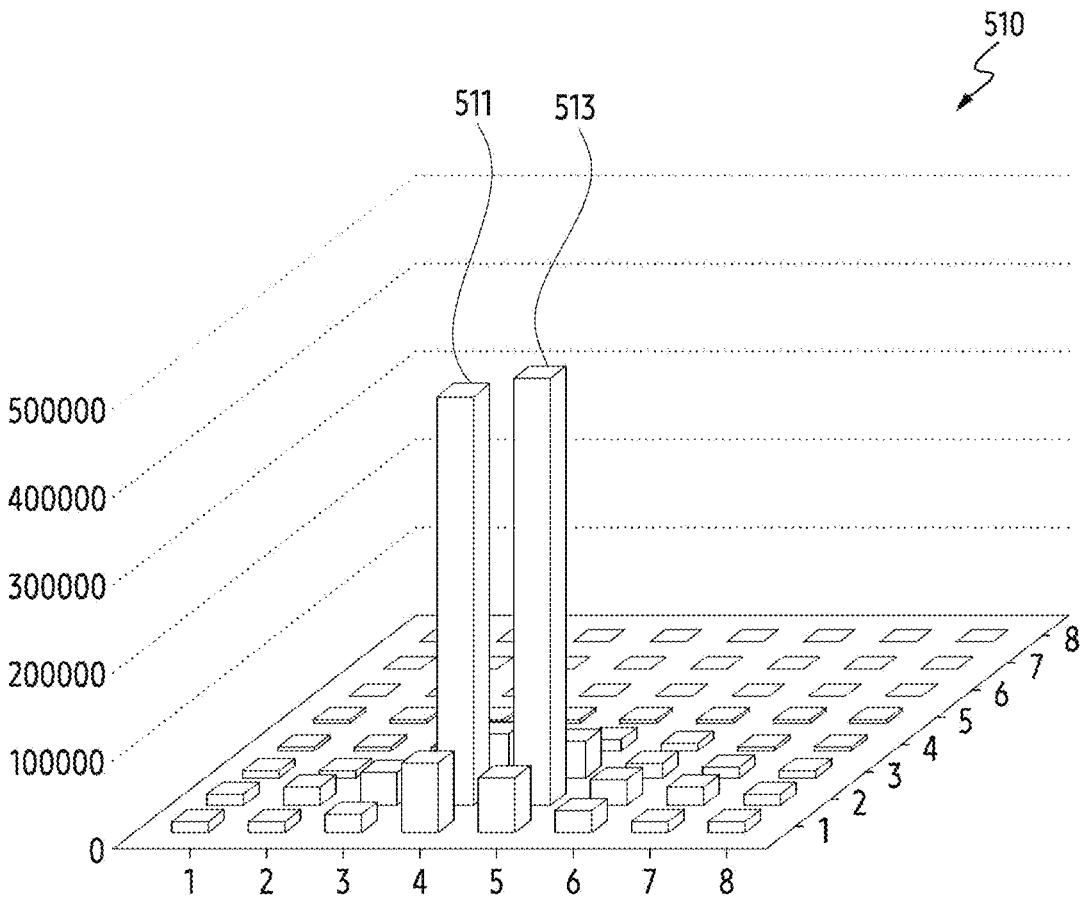
FIG. 5B illustrates a peak signal intensity measured by a distance detection sensor when an electronic device wears a lens-type accessory including a polarized light filter, according to an embodiment of the disclosure.

FIG. 5B illustrates peak signal intensity 510 measured by a distance detection sensor when an electronic device wears a lens-type accessory including a polarized light filter according to an embodiment of the disclosure.

According to embodiments of the disclosure, the distance detection sensor may include 64 sub-sensors. One sub-sensor may receive second signals in which the first signal is reflected by an external object. Each sub-sensor may determine the intensity of the largest second signal in each region, as the peak signal intensity, regardless of the passage of time. The distance detection sensor may obtain a total of 64 peak signal intensities. The distance detection sensor may be a depth sensor. For example, the depth sensor may be a range sensor. For example, the depth sensor may be a structured light (SL) sensor. For example, the depth sensor may be a light detection and ranging (LiDAR) sensor. For example, the depth sensor may be a radar sensor.

Referring to FIG. 5B, a first peak signal intensity 511 represents the peak signal intensity in the (4,2) region. A second peak signal intensity 513 represents the peak signal intensity in the (5,2) region. In the (X, Y) system, 'X' represents X coordinates in space, and 'Y' represents Y coordinates in space. In the (X, Y) system, the peak signal intensity may be indicated by Z coordinates.

The polarized light filter transmits only light vibrating in one direction. The polarized light filter may reduce unintended reflection by glass, water, or the like. The peak signal intensity of each region refers to the peak signal intensity of the second signal reflected from a surface of the polarization filter. When the electronic device wears a polarized light filter, the peak signal intensity of the specific region of the distance detection sensor forms a peak. In other words, when a lens-type accessory including a polarized light filter is worn, the electronic device 101 may identify a deviation information value of the peak signal intensity as greater than or equal to the reference value. For example, the deviation information value may be a value based on a standard deviation. When the electronic device 101 identifies the value based on the standard deviation of the peak signal intensity as being greater than or equal to the reference value, the electronic device 101 identifies that a lens-type accessory is worn. When it is identified that the electronic device 101 wears a lens-type accessory, the electronic device 101 may obtain an image including an external object, using the first camera which is a long-range camera, even if the distance from the external object is less than the first distance. For example, the deviation information value may be a value based on variance. When the electronic device 101 identifies that the value based on the variance of the peak signal intensity is greater than or equal to the reference value, the electronic device 101 identifies that the lens-type accessory is worn. When it is identified that the electronic device 101 wears the lens-type accessory, the electronic device 101 may obtain an image including an external object, using the first camera which is a long-range camera, even if the distance from the external object is less than the first distance.

According to embodiments of the disclosure, since the first peak signal intensity 511 and the second peak signal intensity 513 peak in the (4,2) region and the (5,2) region, the electronic device 101 obtains a standard deviation that is greater than or equal to the reference value. Accordingly, the electronic device 101 identifies that a lens-type accessory is worn. The electronic device 101 may obtain an image including a visual object corresponding to the external object through the first camera.

Referring to Table 4, for example, when the electronic device 101 wears the lens-type accessory including a polarized light filter, the peak signal intensities in 64 regions are as follows. The electronic device 101 may identify whether the external object is positioned close to the camera or whether the electronic device 101 wears the lens-type accessory, based on whether a value based on the standard deviation or variance of the peak signal intensities obtained by 64 sub-sensors is greater than or equal to the reference value.

reflected by an external object. Each sub-sensor may determine the intensity of the largest second signal in each region as the peak signal intensity, regardless of the passage of time. The distance detection sensor may obtain a total of 64 peak signal intensities. The distance detection sensor may be a depth sensor. For example, the depth sensor may be a range sensor. For example, the depth sensor may be a structured light (SL) sensor. For example, the depth sensor may be a light detection and ranging (LiDAR) sensor. For example, the depth sensor may be a radar sensor.

Figure 5C:
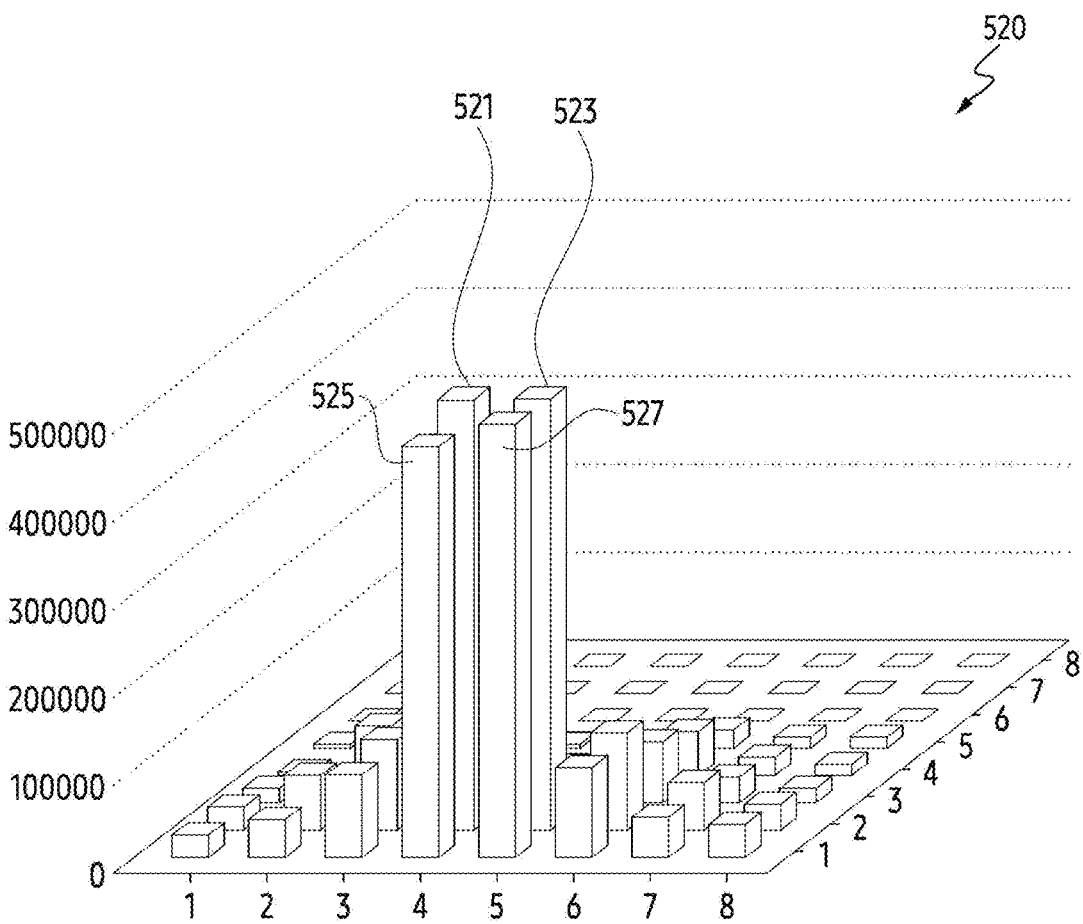
FIG. 5C illustrates a peak signal intensity measured by a distance detection sensor when a vinyl is in proximity to an electronic device, according to an embodiment of the disclosure.

Referring to FIG. 5C, a first peak signal intensity 521 refers to the peak signal intensity in the (4,2) region. A second peak signal intensity 523 refers to the peak signal intensity in the (5,2) region. A third peak signal intensity 525 represents the peak signal intensity in the (4,1) region. A fourth peak signal intensity 527 represents the peak signal intensity in the (5,1) region. In the (X, Y) coordinate system, 'X' represents the X coordinate in space, 'Y' represents the Y coordinate in space, and the peak signal intensity in the (X, Y) may be indicated by the Z coordinate.

When the value based on the standard deviation of the peak signal intensity is obtained to be greater than or equal to the reference value, the electronic device 101 identifies that the electronic device 101 wears a lens-type accessory. The electronic device 101 may identify whether the lens-type accessory is worn using the peak signal intensity, even in the case of a lens-type accessory including an object having an optical property other than a lens or a filter. The object having the optical property may be a vinyl material.

According to embodiments of the disclosure, as the first peak signal intensity 521, the second peak signal intensity 523, the third peak signal intensity 525, and the fourth peak signal intensity 527 peak in the (4,2) region, the (5,2) region, the (4,1) region, and the (5,1) region, respectively, the electronic device 101 obtains the standard deviation greater than or equal to the reference value. Accordingly, the electronic device 101 may identify that the electronic device 101 wears a lens-type accessory, even when the electronic device 101 wears a lens-type accessory including vinyl. The electronic device 101 may obtain an image including a visual object corresponding to the external object through the first camera. The height and position at which the lens shape is located may have more influence on the peak signal intensity rather than the lens properties such as e.g., transmittance, reflection characteristic or the like of the lens, which deter-

TABLE 4

| | X | | | | | | | |
|---|---|---|---|---|---|---|---|---|
| Y | 1 | 2 | 3 | 4 | 5 | 6 | 7 | 8 |
| 1 | 11358 | 16649 | 26940 | 86207 | 76535 | 24015 | 15353 | 13048 |
| 2 | 10067 | 20019 | 43950 | 176623 | 490103 | 38086 | 20063 | 10213 |
| 3 | 10024 | 23194 | 30917 | 89079 | 70013 | 26182 | 14738 | 9346 |
| 4 | 8556 | 10787 | 19346 | 27454 | 25053 | 19447 | 11567 | 6928 |
| 5 | 6005 | 8482 | 10865 | 16311 | 11456 | 11928 | 7833 | 5610 |
| 6 | 5191 | 5717 | 9674 | 11798 | 10379 | 7316 | 5754 | 5046 |
| 7 | 4570 | 4768 | 5897 | 6810 | 6015 | 4945 | 4163 | 4844 |
| 8 | 5235 | 4446 | 4139 | 4462 | 4251 | 4264 | 4631 | 6266 | unit: kcps (kilo count per second)

FIG. 5C illustrates a peak signal intensity 520 measured by a distance detection sensor when a vinyl is in proximity to an electronic device, according to an embodiment of the disclosure.

According to embodiments of the disclosure, the distance detection sensor may include 64 sub-sensors. One sub-sensor may receive second signals in which a first signal is mine the deviation information value of the peak signal. Thus, even if there is an unintended foreign matter or object in front of the camera of the electronic device, it is extremely unlikely that the electronic device 101 will be misled into identifying that the user is wearing a lens-type accessory.

Referring to Table 5, for example, when the electronic device 101 wears a lens-type accessory including vinyl, the peak signal intensities in 64 regions are as follows. The electronic device 101 may identify whether the external object is positioned close to the camera or the electronic device 101 wears the lens-type accessory, based on whether the value based on the standard deviation or variance of the peak signal intensity obtained by the 64 sub-sensors is greater than or equal to the reference value.

TABLE 5

| Y | X | | | | | | | |
|---|---|---|---|---|---|---|---|---|
| | 1 | 2 | 3 | 4 | 5 | 6 | 7 | 8 |
| 1 | 37844 | 63609 | 112561 | 206227 | 520101 | 123972 | 67810 | 47790 |
| 2 | 33385 | 74734 | 146067 | 524287 | 524287 | 152867 | 74134 | 38596 |
| 3 | 31535 | 64594 | 98482 | 176837 | 170145 | 109179 | 72930 | 34601 |
| 4 | 26683 | 33798 | 54985 | 75673 | 79853 | 64393 | 47948 | 29114 |
| 5 | 19100 | 27826 | 31404 | 37832 | 39429 | 33590 | 28099 | 20412 |
| 6 | 13444 | 18143 | 21401 | 27119 | 26535 | 20947 | 18299 | 16453 |
| 7 | 11486 | 11998 | 16695 | 21954 | 17413 | 13655 | 11794 | 14436 |
| 8 | 12946 | 10746 | 10922 | 11241 | 11443 | 11956 | 14463 | 23257 | unit: kcps (kilo count per second)

Figure 6A:
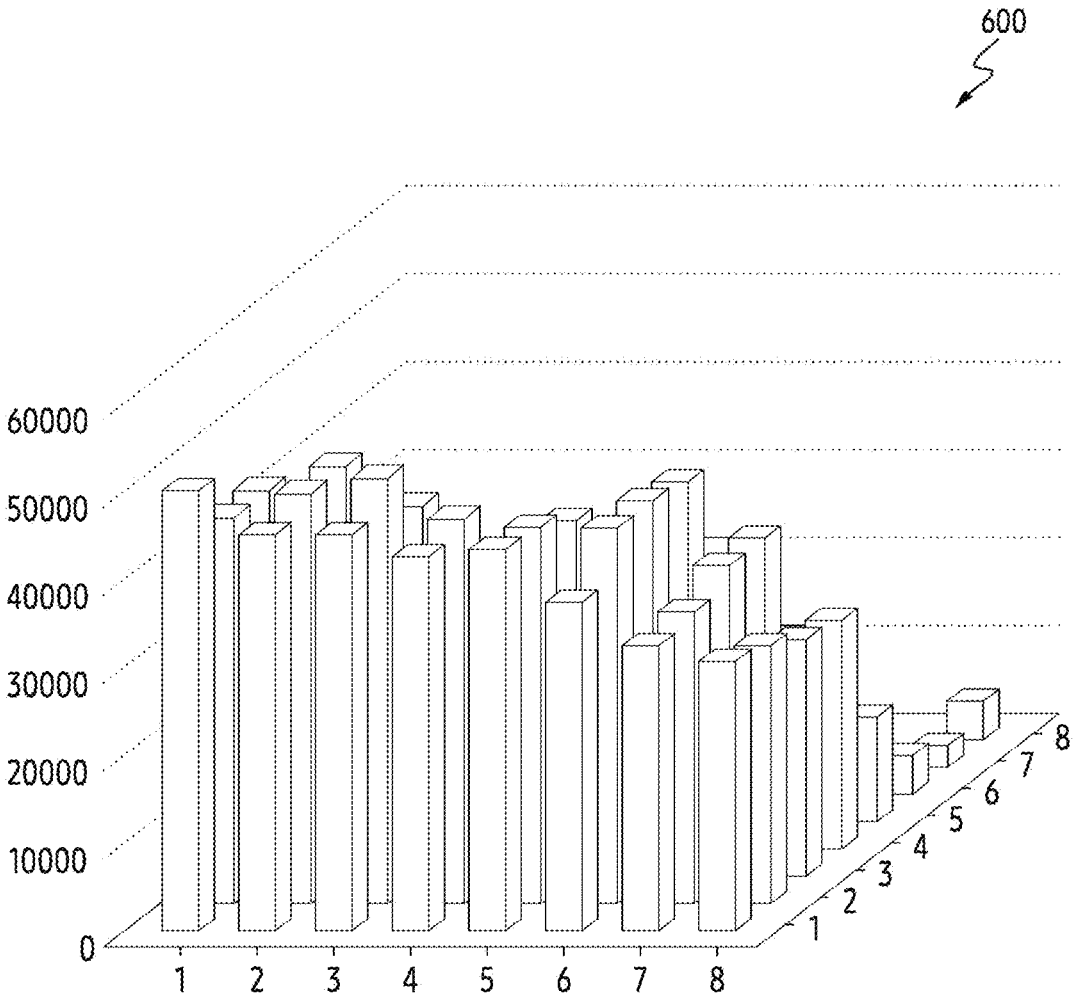
FIG. 6A illustrates a peak signal intensity measured by a distance detection sensor when a note is in proximity to an electronic device, according to an embodiment of the disclosure.

FIG. 6A illustrates a peak signal intensity 600 measured by a distance detection sensor when a note is in proximity to the electronic device, according to an embodiment of the disclosure.

The distance detection sensor may be a depth sensor. For example, the depth sensor may be a range sensor. For example, the depth sensor may be a structured light (SL) sensor. For example, the depth sensor may be a light detection and ranging (LiDAR) sensor. For example, the depth sensor may be a radar sensor.

Referring to FIG. 6A, it may be seen that the peak signal intensities are evenly distributed for each region. In the (X, Y) system, 'X' represents X coordinates in space, and 'Y' represents Y coordinates. In the (X, Y) system, the peak signal intensity is indicated by Z coordinates.

The peak signal intensity is relatively higher in a wide region close to a light emitting unit. Therefore, the standard deviation of the peak signal intensity may be equal to or less than (smaller than) a reference value. The electronic device 101 may identify that the lens-type accessory is not worn. The electronic device 101 may obtain an image including a visual object corresponding to the external object through the second camera according to camera switching, based on the standard deviation less than (smaller than) the reference value.

A note is not an object with any optical properties. Thus, even if the note is in close proximity thereto, the electronic device 101 does not identify that it wears a lens-type accessory. The electronic device 101 may obtain an image including a visual object corresponding to an external object using the second camera which is a short-range camera.

Referring to Table 6 below, for example, when the note is in proximity to the electronic device 101, the peak signal intensities in 64 regions are as follows. The electronic device 101 may identify whether the external object is positioned close to the camera or the electronic device 101 wears the lens-type accessory, based on whether the value obtained based on the standard deviation or variance of the peak signal intensity obtained by the 64 sub-sensors is greater than or equal to the reference value.

TABLE 6

| Y | X | | | | | | | |
|---|---|---|---|---|---|---|---|---|
| | 1 | 2 | 3 | 4 | 5 | 6 | 7 | 8 |
| 1 | 11358 | 16649 | 26940 | 86207 | 76535 | 24015 | 15353 | 13048 |
| 2 | 10067 | 20019 | 43950 | 476623 | 490103 | 38086 | 20063 | 10213 |
| 3 | 10024 | 23194 | 30917 | 89079 | 70013 | 26182 | 14738 | 9346 |
| 4 | 8556 | 10787 | 19346 | 27454 | 25053 | 19447 | 11567 | 6928 |
| 5 | 6005 | 8482 | 10865 | 16311 | 11456 | 11928 | 7833 | 5610 |
| 6 | 5191 | 5717 | 9674 | 11798 | 10379 | 7316 | 5754 | 5046 |
| 7 | 4570 | 4768 | 5897 | 6810 | 6015 | 4945 | 4163 | 4844 |
| 8 | 5235 | 4446 | 4139 | 4462 | 4251 | 4264 | 4631 | 6266 | unit: kcps (kilo count per second)

Figure 6B:
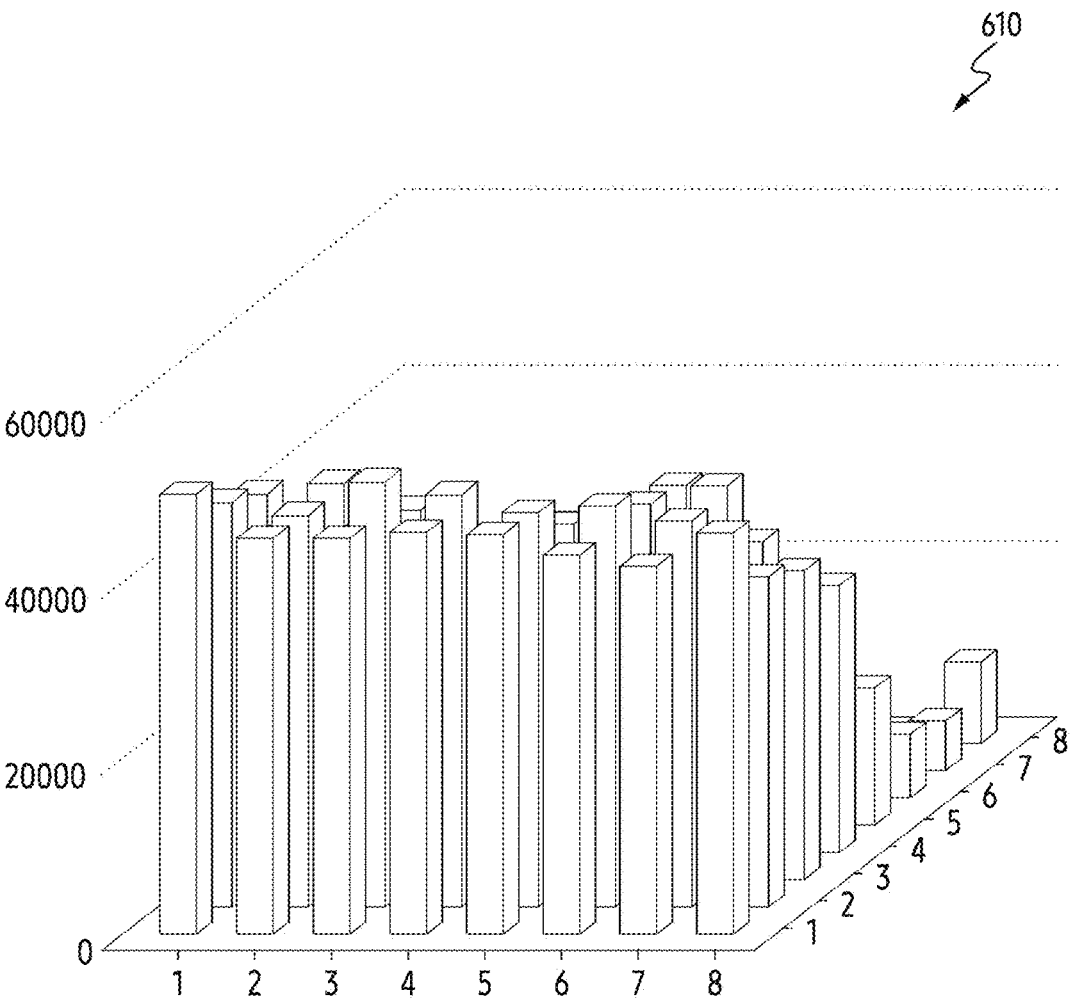
FIG. 6B illustrates a peak signal intensity measured by a distance detection sensor when a piece of white paper is in proximity to an electronic device, according to an embodiment of the disclosure.

FIG. 6B illustrates a peak signal intensity 610 measured by the distance detection sensor when white a piece of while paper is in proximity to the camera, according to an embodiment of the disclosure.

The distance detection sensor may be a depth sensor. For example, the depth sensor may be a range sensor. For example, the depth sensor may be a structured light (SL) sensor. For example, the depth sensor may be a light detection and ranging (LiDAR) sensor. For example, the depth sensor may be a radar sensor.

Referring to FIG. 6B, it may be seen that the peak signal intensities for each region are evenly distributed. In the (X, Y) system, 'X' represents the X coordinates in space, and 'Y' represents the Y coordinates in space. In the (X, Y) system, the peak signal intensity is indicated by the Z coordinates.

The standard deviation of the peak signal intensity may be less than the reference value. Accordingly, the electronic device 101 may identify that the lens-type accessory is not worn. The electronic device 101 may obtain an image including a visual object corresponding to the external object through the second camera according to camera switching, based on the standard deviation less than the reference value.

White paper is not an object with any optical properties. Therefore, even when the white paper is in close proximity thereto, the electronic device 101 does not identify that it wears a lens-type accessory. The electronic device 101 may obtain an image including a visual object corresponding to an external object, using the second camera which is a short-range camera.

Referring to Table 7 below, in case where the white paper is in proximity to the electronic device 101, the peak signal intensities in 64 regions are as follows. The electronic device 101 may identify whether the external object is positioned close to the camera or whether the electronic device 101 wears the lens-type accessory, based on whether the value obtained based on the standard deviation or variance of the peak signal intensity obtained by the 64 sub-sensors is greater than or equal to the reference value.

second (kcps). Since the ambient values of the second graph 703 are all less than 15 kcps, it may be said that the external object is placed in an environment where the infrared ratio is relatively low.

In the second graph 703, when a lens-type accessory is worn in an environment where an infrared ratio is relatively low, the peak signal intensities form peaks in regions (4,1), (4,2), (5,1) and (5,2), respectively. In other words, a deviation information value of the peak signal intensity is identified to be greater than or equal to the reference value. According to an embodiment of the disclosure, the deviation information may include the standard deviation. According to an embodiment of the disclosure, the deviation information may include the variance. Accordingly, the electronic device 101 may identify whether the external object is positioned close to the camera or whether the electronic device 101 wears the lens-type accessory, based on whether the value based on the standard deviation or variance of the peak signal intensity obtained by the 64 sub-sensors is

TABLE 7

| Y | X | | | | | | | |
|---|---|---|---|---|---|---|---|---|
| | 1 | 2 | 3 | 4 | 5 | 6 | 7 | 8 |
| 1 | 520825 | 492408 | 492626 | 498378 | 491101 | 470857 | 442188 | 524287 |
| 2 | 474815 | 488229 | 520307 | 486358 | 483876 | 486458 | 468845 | 420634 |
| 3 | 442875 | 492677 | 462631 | 418140 | 396068 | 448718 | 459189 | 402988 |
| 4 | 368921 | 379048 | 390605 | 340008 | 344641 | 385948 | 387514 | 331916 |
| 5 | 217142 | 276899 | 287010 | 255066 | 265863 | 268988 | 266752 | 187118 |
| 6 | 111576 | 142528 | 156657 | 166350 | 160889 | 144815 | 129204 | 104108 |
| 7 | 88906 | 95424 | 100709 | 109819 | 102257 | 96056 | 86230 | 97105 |
| 8 | 112706 | 91683 | 82638 | 81633 | 84450 | 88001 | 99992 | 142197 | unit: kcps (kilo count per second)

Figure 7A:
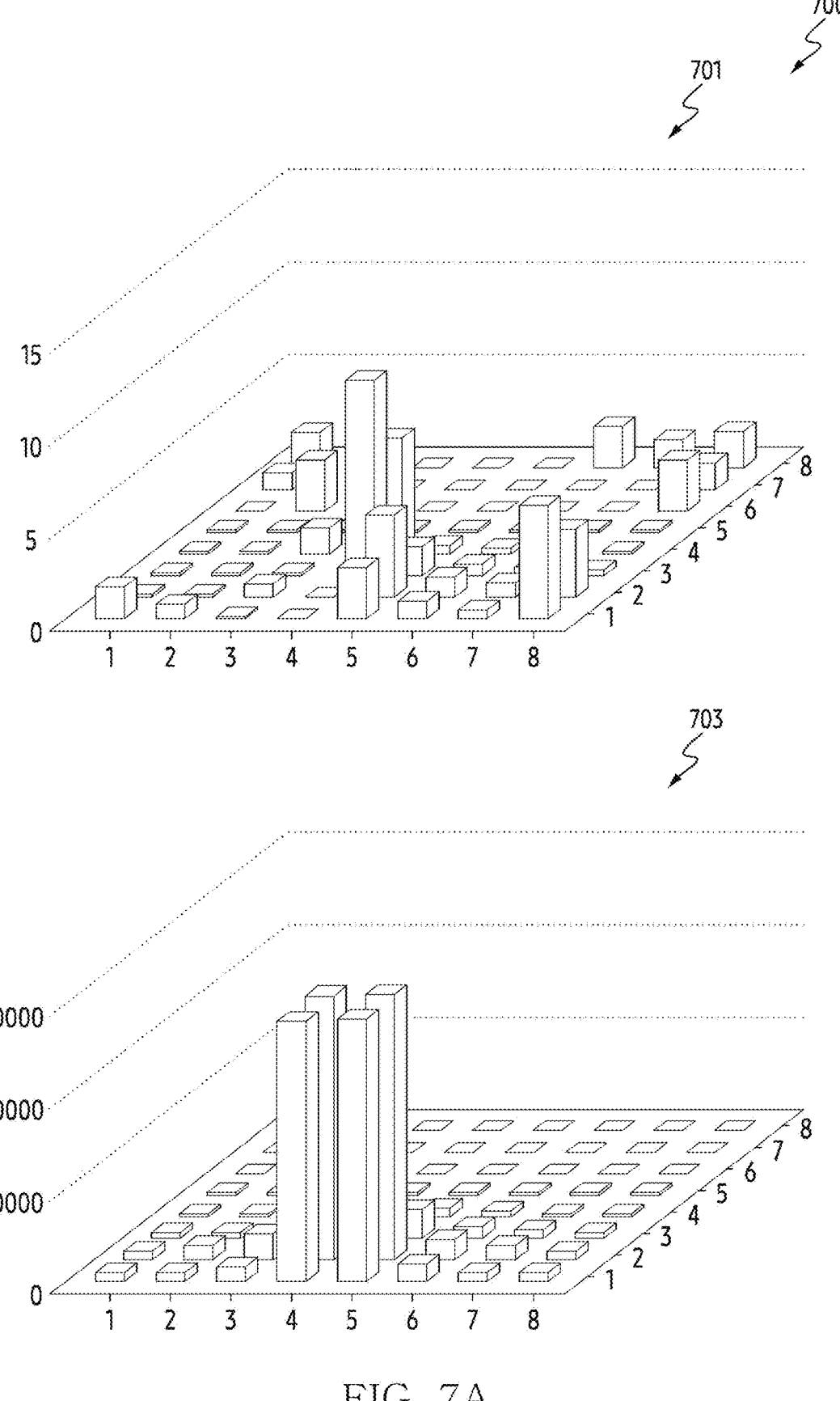
FIG. 7A illustrates a peak signal intensity measured by a distance detection sensor in an environment in which an infrared ratio is relatively low, according to an embodiment of the disclosure.

FIG. 7A illustrates a peak signal intensity 700 measured by the distance detection sensor in an environment where an infrared ratio is relatively low, according to an embodiment of the disclosure.

The distance detection sensor may be a depth sensor. For example, the depth sensor may be a range sensor. For example, the depth sensor may be a structured light (SL) sensor. For example, the depth sensor may be a light detection and ranging (LiDAR) sensor. For example, the depth sensor may be a radar sensor.

Referring to FIG. 7A, a first graph 701 shows infrared intensity of a light source irradiated to an external object, measured by the distance detection sensor. A second graph 703 shows peak signal intensity measured for each region of the distance detection sensor in an environment where an ND filter is worn and an infrared ratio is relatively not high. In the (X, Y) system, 'X' represents the X coordinates in space, and 'Y' represents the Y coordinates in space. In the (X, Y) system, the peak signal intensity is indicated by the Z coordinates. The unit of peak signal intensity is kilo count per second (kcps).

The first graph 701 shows the infrared intensity of the light source irradiated to the external object, measured by the distance detection sensor. In the (X, Y) system, 'X' represents the X coordinates in space, and 'Y' represents the Y coordinates in space. In the (X, Y) system, an ambient value measured by each sub-sensor of the distance detection sensor is indicated by the Z coordinate. The ambient value may refer to a value based on the infrared detection intensity of the corresponding region. The higher the infrared intensity detected in the corresponding region, the higher the Z coordinate value. The unit of the Z-axis is kilo count per greater than or equal to the reference value. Therefore, the electronic device 101 may identify whether the lens-type accessory is worn based on the peak signal intensity in an environment where the infrared ratio is relatively low.

Figure 7B:
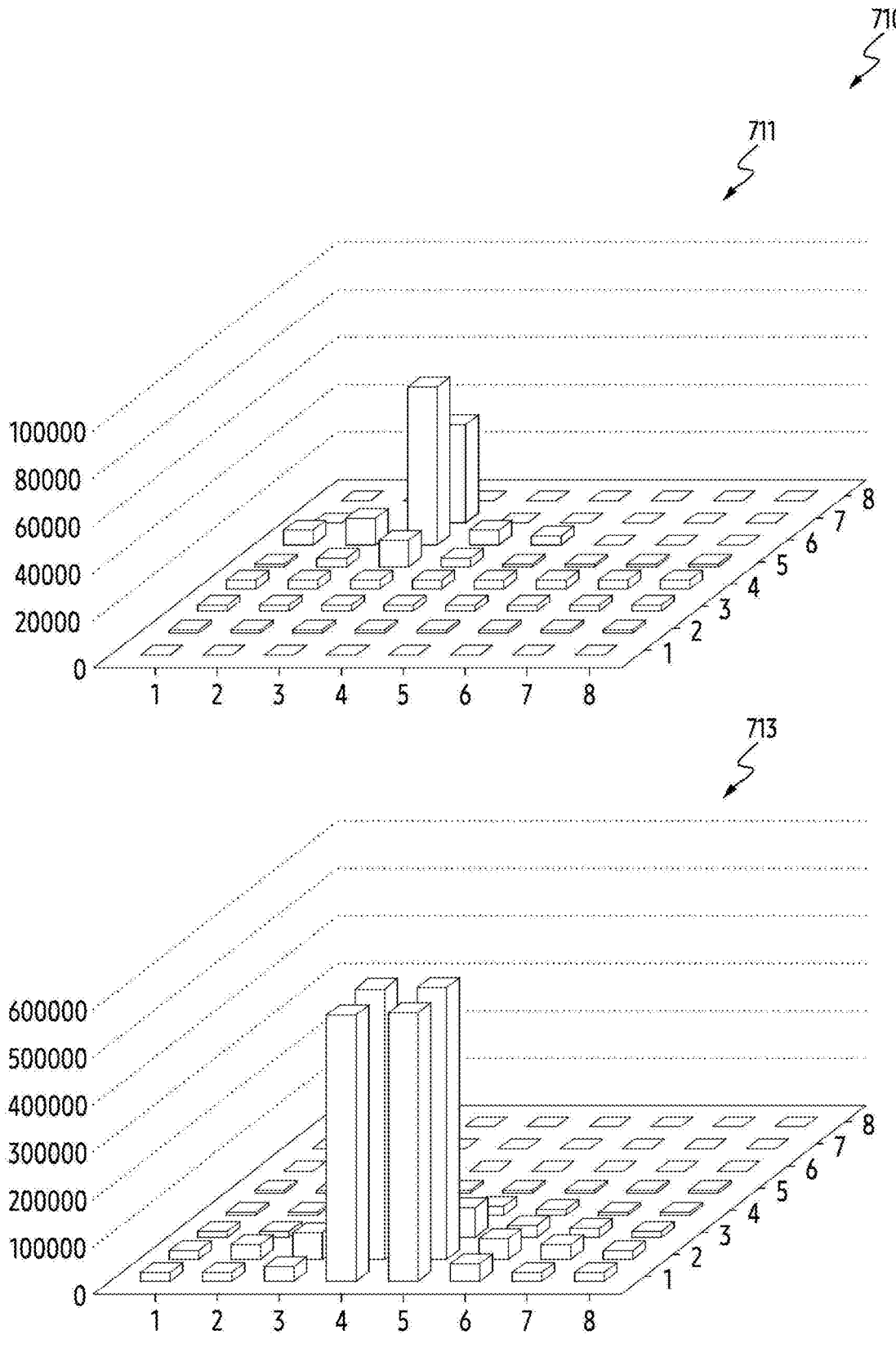
FIG. 7B illustrates a peak signal intensity measured by a distance detection sensor in an environment in which an infrared ratio is relatively high, according to an embodiment of the disclosure.

FIG. 7B illustrates a peak signal intensity 710 measured by the distance detection sensor in an environment where an infrared ratio is relatively high, according to an embodiment of the disclosure.

The distance detection sensor may be a depth sensor. For example, the depth sensor may be a range sensor. For example, the depth sensor may be a structured light (SL) sensor. For example, the depth sensor may be a light detection and ranging (LiDAR) sensor. For example, the depth sensor may be a radar sensor.

Referring to FIG. 7B, a first graph 711 shows infrared intensity of a light source irradiated to an external object, measured by the distance detection sensor. A second graph 713 shows peak signal intensity measured for each region of the distance detection sensor in an environment in which an ND filter is worn and an infrared ratio is relatively high. In the (X, Y) system, 'X' represents the X coordinates in space, and 'Y' represents the Y coordinates in space. In the (X, Y) system, the peak signal intensity is indicated by the Z coordinates. The unit of the Z axis is kilo count per second (kcps).

The first graph 711 shows the infrared intensity of the light source irradiated to the external object measured by the distance detection sensor. In the (X, Y) system, 'X' represents the X coordinates in space, and 'Y' represents the Y coordinates in space. In the (X, Y) system, the ambient value measured by each sub-sensor of the distance detection sensor is indicated by the Z coordinate. The ambient value may refer to a value based on the infrared intensity detected in the corresponding region. The higher the infrared intensity detected in the corresponding region, the higher the Z coordinate value. The unit of the Z-axis is kilo count per second (kcps). Since the maximum ambient value of the second graph 703 is 80000 kcps, it may be said that the external object is placed in an environment where the infrared ratio is relatively high.

In the second graph 703, when a lens-type accessory is worn in an environment in which the infrared ratio is relatively high, the peak signal intensities form peaks in the regions (4,1), (4,2), (5,1) and (5,2), respectively. That is to say, the deviation information value of the peak signal intensity is identified to be greater than or equal to the reference value. According to an embodiment of the disclosure, the deviation information may include the standard deviation. According to an embodiment of the disclosure, the deviation information may include the variance. Accordingly, the electronic device 101 may identify whether the external object is positioned close to the camera or whether the electronic device 101 wears the lens-type accessory, based on whether the value based on the standard deviation or variance of the peak signal intensity obtained by the 64 sub-sensors is greater than or equal to the reference value. Therefore, the electronic device 101 may identify whether the lens-type accessory is worn based on the peak signal intensity in an environment in which the infrared ratio is relatively low.

The electronic device or method according to the embodiments may perform a camera switching based on a distance from an external object of the distance detection sensor, when a lens-type accessory including a neutral density (ND) filter or a polarized light filter is worn.

Even if the electronic device wears a lens-type accessory, the electronic device or method according to the embodiments may be used to obtain a clear picture using a camera having an appropriate depth.

As described above, a method performed by an electronic device according to embodiments may comprise receiving, through a distance detection sensor, second signals in which a first signal transmitted through the distance detection sensor is reflected by an external object. The method may comprise identifying a distance from the external object based on at least a part of the second signals. The method may comprise obtaining a deviation information value for the second signals based on identifying that the distance is less than a reference distance. The method may comprise obtaining an image including a visual object corresponding to the external object through a first camera, based on the deviation information value being greater than or equal to a reference value. The method may comprise obtaining the image including the visual object corresponding to the external object through a second camera according to a camera switching, based on the deviation information value being less than the reference value.

According to embodiments of the disclosure, a focal length of the first camera may be greater than a focal length of the second camera.

According to embodiments of the disclosure, a deviation information value for the second signals may be determined based on a standard deviation of a peak signal intensity for each region of the distance detection sensor among the second signals.

According to embodiments of the disclosure, the deviation information value for the second signals may be determined based on a variance of a peak signal intensity for each region of the distance detection sensor among the second signals.

According to embodiments of the disclosure, the distance from the external object may be the largest among a plurality of distances calculated based on at least a part of the second signals.

According to embodiments of the disclosure, the first signal and the second signals may be electromagnetic waves.

According to embodiments of the disclosure, the distance from the external object may comprise a method determined based on a time interval between a transmission of the first signal and a reception of the second signal.

According to embodiments of the disclosure, the distance from the external object may comprise a method determined based on a difference between a phase of the first signal and a phase of the second signal.

According to embodiments of the disclosure, the method may further comprise identifying a zoom scale. The method may further comprise obtaining the deviation information value for the second signals based on the zoom scale being less than a reference scale.

As described above, a method performed by an electronic device according to embodiments may comprise receiving, through a distance detection sensor, second signals in which a first signal transmitted through the distance detection sensor is reflected by an external object. The method may comprise identifying a distance from the external object based on at least a part of the second signals. The method may comprise obtaining a deviation information value for the second signals based on identifying the distance being less than a reference distance. The method may comprise obtaining an image including a visual object corresponding to the external object through a first camera according to a camera switching, based on the deviation information value being greater than or equal to a reference value. The method may comprise obtaining the image including the visual object corresponding to the external object through a second camera, based on the deviation information value being less than the reference value.

According to embodiments of the disclosure, a focal length of the first camera may be greater than the focal length of the second camera.

As described above, an electronic device according to embodiments may comprise at least one processor, a distance detection sensor, and a plurality of cameras including a first camera and a second camera. The at least one processor may be configured to receive, through a distance detection sensor, second signals in which a first signal transmitted through the distance detection sensor is reflected by an external object. The at least one processor may be configured to identify a distance from the external object based on at least a part of the second signals. The at least one processor may be configured to obtain a deviation information value for the second signals based on identifying the distance being less than a reference distance. The at least one processor may be configured to obtain an image including a visual object corresponding to the external object through a first camera, based on the deviation information value being greater than or equal to a reference value. The at least one processor may be configured to obtain the image including the visual object corresponding to the external object through a second camera according to a camera switching, based on the deviation information value being less than the reference value.

According to embodiments of the disclosure, a focal length of the first camera may be greater than a focal length of the second camera.

According to embodiments of the disclosure, a deviation information value for the second signals may be determined based on a standard deviation of a peak signal intensity for each region of the distance detection sensor among the second signals.

According to embodiments of the disclosure, the deviation information value for the second signals may be determined based on a variance of a peak signal intensity for each region of the distance detection sensor among the second signals.

According to embodiments of the disclosure, the distance from the external object may be the largest among a plurality of distances calculated based on at least a part of the second signals.

According to embodiments of the disclosure, the first signal and the second signals may be electromagnetic waves.

According to embodiments of the disclosure, the distance from the external object may be determined based on a time interval between a transmission of the first signal and a reception of the second signal.

According to embodiments of the disclosure, the distance from the external object may be determined based on a difference between a phase of the first signal and a phase of the second signal.

According to embodiments of the disclosure, the at least one processor may be further configured to identify a zoom scale, and obtain the deviation information value for the second signals based on the zoom scale being less than a reference scale.

As described above, an electronic device according to embodiments may comprise at least one processor, a distance detection sensor, and a plurality of cameras including a first camera and a second camera. The at least one processor may be configured to receive, through a distance detection sensor, second signals in which a first signal transmitted through the distance detection sensor is reflected by an external object. The at least one processor may be configured to identify a distance from the external object based on at least a part of the second signals. The at least one processor may be configured to obtain a deviation information value for the second signals, based on identifying the distance being less than a reference distance. The at least one processor may be configured to obtain an image including a visual object corresponding to the external object through a first camera according to a camera switching, based on the deviation information value being greater than or equal to a reference value. The at least one processor may be configured to obtain the image including the visual object corresponding to the external object through a second camera, based on the deviation information value being less than the reference value.

According to embodiments of the disclosure, a focal length of the first camera may be greater than a focal length of the second camera.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments and the terms used therein are not intended to limit the technological features set forth herein to particular embodiments and include various changes, equivalents, or replacements for a corresponding embodiment. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd" or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may be interchangeably used with other terms, for example, "logic", "logic block", "unit", "part", "portion", or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to various embodiment of the disclosure, a method according to various embodiments disclosed herein may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage, such as, for example, a storage device like read only memory (ROM), whether erasable or rewritable or not, or in the form of memory such as, for example, random access memory (RAM), memory chips, device or integrated circuits or on an optically or magnetically readable medium, such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by an electronic device, the method comprising:
   receiving, through a distance detection sensor, second signals in which a first signal transmitted through the distance detection sensor is reflected by an external object;
   identifying a distance from the external object based on at least a part of the second signals;
   obtaining a deviation information value for the second signals based on identifying that the distance is less than a reference distance;
   obtaining an image including a visual object corresponding to the external object through a first camera based on the deviation information value being greater than or equal to a reference value; and
   obtaining the image including the visual object corresponding to the external object through a second camera according to a camera switching, based on the deviation information value being less than the reference value.

2. The method of claim 1, wherein a focal length of the first camera is longer than the focal length of the second camera.

3. The method of claim 1, wherein the deviation information value for the second signals is determined based on a standard deviation of a peak signal intensity for each region of the distance detection sensor among the second signals.

4. The method of claim 1, wherein the deviation information value for the second signals is determined based on a variance of a peak signal for each region of the distance detection sensor among the second signals.

5. The method of claim 1, wherein the distance from the external object is longest among a plurality of distances calculated based on at least a part of the second signals.

6. The method of claim 1, wherein the first signal and the second signals are electromagnetic waves.

7. The method of claim 1, wherein the distance from the external object is determined based on a time interval between a transmission of the first signal and a reception of the second signals.

8. The method of claim 1, wherein the distance from the external object is determined based on a difference between a phase of the first signal and a phase of the second signals.

9. The method of claim 1, further comprising:
   identifying a zoom scale; and
   obtaining the deviation information value for the second signals based on the zoom scale being less than a reference scale.

10. An electronic device comprising:
   at least one processor;
   a distance detection sensor;
   a plurality of cameras including a first camera and a second camera; and
   memory storing instructions that, when executed by the at least one processor individually or collectively, cause the electronic device to:
      receive, through the distance detection sensor, second signals in which a first signal transmitted through the distance detection sensor is reflected by an external object,
      identify a distance from the external object based on at least a part of the second signals,
      obtain a deviation information value for the second signals based on identifying that the distance is less than a reference distance,
      obtain an image including a visual object corresponding to the external object through a first camera based on the deviation information value being greater than or equal to a reference value, and
      obtain the image including the visual object corresponding to the external object through a second camera according to a camera switching, based on the deviation information value being less than the reference value.

11. The electronic device of claim 10, wherein a focal length of the first camera is longer than the focal length of the second camera.

12. The electronic device of claim 10, wherein the deviation information value for the second signals is determined based on a standard deviation of a peak signal intensity for each region of the distance detection sensor among the second signals.

13. The electronic device of claim 10, wherein the deviation information value for the second signals is determined based on a variance of a peak signal for each region of the distance detection sensor among the second signals.

14. The electronic device of claim 10, wherein the distance from the external object is longest among a plurality of distances calculated based on at least a part of the second signals.

15. The electronic device of claim 10, wherein the first signal and the second signals are electromagnetic waves.

16. The electronic device of claim 10, wherein the distance from the external object is determined based on a time interval between a transmission of the first signal and a reception of the second signals.

17. The electronic device of claim 10, wherein the distance from the external object is determined based on a difference between a phase of the first signal and a phase of the second signals.

18. The electronic device of claim 10, wherein the instructions that, when executed by the at least one processor individually or collectively, cause the electronic device to:

identify a zoom scale, and
obtain the deviation information value for the second signals based on the zoom scale being less than a reference scale.

19. One or more non-transitory computer-readable storage media storing computer-executable instructions that, when executed by one or more processors individually or collectively, cause an electronic device to perform operations, the operations comprising:

receiving, through a distance detection sensor, second signals in which a first signal transmitted through the distance detection sensor is reflected by an external object;

identifying a distance from the external object based on at least a part of the second signals;

obtaining a deviation information value for the second signals based on identifying that the distance is less than a reference distance;

obtaining an image including a visual object corresponding to the external object through a first camera based on the deviation information value being greater than or equal to a reference value; and obtaining the image including the visual object corresponding to the external object through a second camera according to a camera switching, based on the deviation information value being less than the reference value.

20. The one or more non-transitory computer-readable storage media of claim 19, wherein a focal length of the first camera is longer than the focal length of the second camera.

* * * * *